(12) United States Patent
Suzuki et al.

(10) Patent No.: US 11,338,642 B2
(45) Date of Patent: May 24, 2022

(54) VEHICLE CABIN AIR CONDITIONING SYSTEM

(71) Applicant: DENSO CORPORATION, Kariya (JP)

(72) Inventors: Tatsuhiro Suzuki, Kariya (JP); Michio Nishikawa, Kariya (JP); Shigeru Kawano, Kariya (JP); Akane Kuroda, Kariya (JP)

(73) Assignee: DENSO CORPORATION, Kariya (JP)

( * ) Notice: Subject to any disclaimer, the term of this patent is extended or adjusted under 35 U.S.C. 154(b) by 44 days.

(21) Appl. No.: 17/080,004

(22) Filed: Oct. 26, 2020

(65) Prior Publication Data

US 2021/0053416 A1 Feb. 25, 2021

Related U.S. Application Data

(63) Continuation of application No. PCT/JP2019/015913, filed on Apr. 12, 2019.

(30) Foreign Application Priority Data

May 7, 2018 (JP) .............................. JP2018-089385

(51) Int. Cl.
*B60H 1/00* (2006.01)
*B60H 1/32* (2006.01)
*B60H 1/22* (2006.01)

(52) U.S. Cl.
CPC ..... *B60H 1/00285* (2013.01); *B60H 1/00028* (2013.01); *B60H 1/00814* (2013.01); (Continued)

(58) Field of Classification Search
CPC ............. B60H 1/00285; B60H 1/3228; B60H 1/00028; B60H 1/00814; B60H 1/22; (Continued)

(56) References Cited

U.S. PATENT DOCUMENTS 10,850,652 B2 * 12/2020 Lee .................... B60N 2/5657
2003/0080714 A1 5/2003 Inoue et al.
(Continued)

FOREIGN PATENT DOCUMENTS

DE 102012112629 A1 7/2013
JP 2000-280724 A 10/2000
(Continued)

OTHER PUBLICATIONS

U.S. Appl. No. 17/080,157, filed Oct. 26, 2020, Tatsuhiro Suzuki et al.
Tatsuhiro Suzuki et. al.

*Primary Examiner* — Marc E Norman
(74) *Attorney, Agent, or Firm* — Harness, Dickey & Pierce, P.L.C.

(57) ABSTRACT

A vehicle cabin air conditioning system includes a cabin indoor air conditioner and an individual air conditioner configured to condition air in a target space inside a cabin. The individual air conditioner includes a blower, a heat generator, a supply port, and an exhaust port. The supply port supplies one of a cold air cooled with the heat generator and a warm air heated with the heat generator to the target space. The exhaust port provides the other of the cold air and the warm air to outside of the target space. The cabin indoor air conditioner includes a cabin blower, a temperature control unit, and a suction port through which air is sucked for the temperature control unit. An air flow path is provided to guide air sent from the exhaust port of the individual air conditioner to the suction port of the cabin indoor air conditioner.

7 Claims, 16 Drawing Sheets

(52) U.S. Cl.
CPC ............ *B60H 1/22* (2013.01); *B60H 1/3216* (2013.01); *B60H 1/3227* (2013.01); *B60H 1/3228* (2019.05); *B60H 2001/003* (2013.01); *B60H 2001/0015* (2013.01); *B60H 2001/00114* (2013.01); *B60H 2001/00178* (2013.01)

(58) Field of Classification Search
CPC ........ B60H 1/3227; B60H 2001/00114; B60H 2001/0015; B60H 2001/00178; B60H 2001/003
See application file for complete search history.

(56) References Cited

U.S. PATENT DOCUMENTS

| | | |
|---|---|---|
| 2013/0167556 A1 | 7/2013 | Jun et al. |
| 2020/0130467 A1* | 4/2020 | Imaizumi ........... B60H 1/00849 |
| 2021/0039476 A1* | 2/2021 | Suzuki ................ B60H 1/3204 |

FOREIGN PATENT DOCUMENTS

| | | |
|---|---|---|
| JP | 2016-137846 A | 8/2016 |
| JP | 2016145015 A | 8/2016 |

* cited by examiner

VEHICLE CABIN AIR CONDITIONING SYSTEM

CROSS REFERENCE TO RELATED APPLICATIONS

The present application is a continuation application of International Patent Application No. PCT/JP2019/015913 filed on Apr. 12, 2019, which designated the U.S. and claims the benefit of priority from Japanese Patent Application No. 2018-89385 filed on May 7, 2018. The entire disclosures of all of the above applications are incorporated herein by reference.

TECHNICAL FIELD

The present disclosure relates to a vehicle cabin air conditioning system.

BACKGROUND

There have been conventionally developed various techniques relating to a cabin air conditioning in order to improve comfort of an occupant inside a cabin of a vehicle. Currently, as one of such technologies, an air conditioner that conditions the entire cabin is applied to many vehicles.

SUMMARY

According to a first aspect of the present disclosure, a vehicle cabin air conditioning system includes a cabin indoor air conditioner for conditioning air inside the cabin, and an individual air conditioner for conditioning air in a target space predetermined air inside the cabin. The individual air conditioner has a blower, a heat generator, a supply port, and an exhaust port. The blower is arranged inside a housing. The heat generator concurrently generates cold heat for cooling air blown by the blower and warm heat for heating the air inside the housing. The supply port supplies at least one of the cold air obtained by cooling the air with the cold heat by the heat generator and the warm air obtained by heating the air with the warm heat by the heat generator to the target space. The exhaust port sends at least the other of the cold air and the warm air to the outside of the target space. The cabin indoor air conditioner includes a cabin blower, a temperature control unit, and a suction port. The cabin blower blows conditioned air to be supplied into the cabin. The temperature control unit adjusts the temperature of the air blown by the cabin blower to make the conditioned air. Air is sucked into the suction port, and the temperature of air is adjusted by the temperature control unit. The vehicle cabin air conditioning system further has an air flow path that guides the air from the exhaust port of the individual air conditioner to the suction port of the cabin indoor air conditioner.

BRIEF DESCRIPTION OF DRAWINGS

The above and other objects, features and advantages of the present disclosure will be more apparent from the following detailed description with reference to the accompanying drawings. In the accompanying drawings.

DETAILED DESCRIPTION

Figure 1:
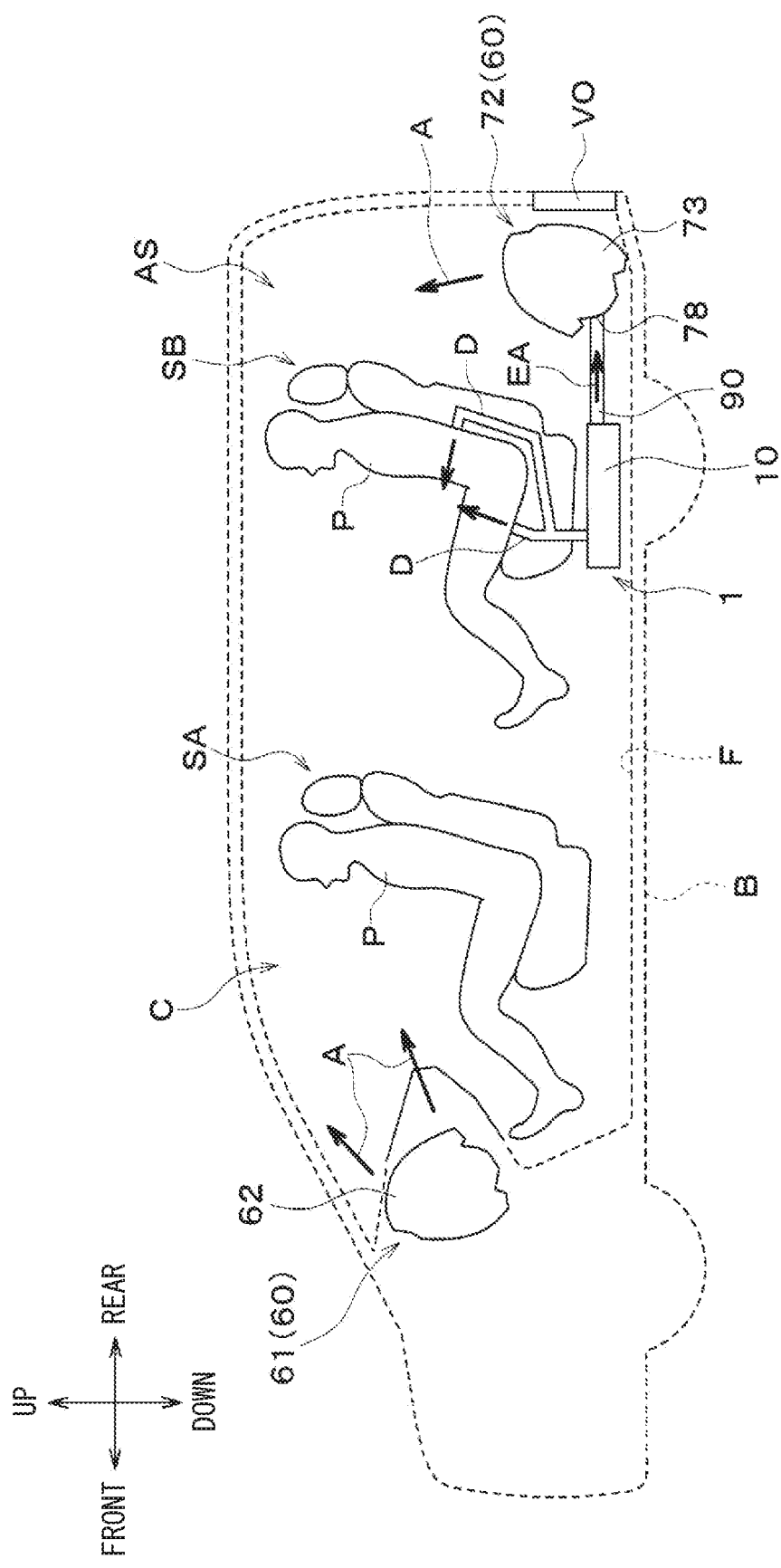
FIG. 1 is an overall configuration diagram of a vehicle cabin air conditioning system according to a first embodiment.

To begin with, examples of relevant techniques will be described.

There have been conventionally developed various techniques relating to a cabin air conditioning in order to improve comfort of an occupant inside a cabin of a vehicle. Currently, as one of such technologies, an air conditioner that conditions the entire cabin is applied to many vehicles.

There is an art for realizing another air conditioning mode in the cabin. A seat air conditioner is configured to improve comfort by conditioning air in a seat arranged in a vehicle as a target space.

The seat air conditioner has a housing receiving components such as a vapor compression refrigeration cycle device or a blower, for example, arranged between a seat bottom of the seat and a floor surface. The seat air conditioner can supply the seat with air having temperature adjusted by the refrigeration cycle device.

The seat air conditioner provides cold air and warm air by adjusting the temperature of air sucked from outside of the housing using the refrigeration cycle. The seat air conditioner supplies one of the warm air heated by the condenser and the cold air cooled by the evaporator to the seat which is a target space, of the air conditioned by the refrigeration cycle device. The other of the warm air and the cold air is exhausted to the outside of the housing.

Regarding the air conditioning in the cabin, the art of seat air conditioner may be applied in addition to the air conditioner for conditioning the entire cabin. In this case, the exhaust air from the seat air conditioner is exhausted into the cabin. In this case, the effect of exhaust heat from the seat air conditioner is to be considered on the environment inside the cabin.

For example, when the exhaust air is discharged into the cabin, the exhaust heat of the seat air conditioner may cause mist during a cooling operation or may cause chill during a heating operation, thereby lowering the comfort in the cabin.

It is conceivable to reduce the influence of exhaust heat by discharging the air exhausted from the seat air conditioner to the outside of the cabin. In this case, since the pressure inside the vehicle is negative, it is difficult to simply realize the flow of air from the cabin to the outside.

Then, in this case, since the cabin has a negative pressure, the inflow amount of draft air from the outside of the vehicle increases and the thermal load for air conditioning also increases. Further, unpleasant odor outside the vehicle may enter the cabin due to the inflow of draft air from the outside of the vehicle.

The present disclosure provides a vehicle cabin air conditioning system having a cabin indoor air conditioner that conditions air inside the cabin and an individual air conditioner that conditions air in a target space, while the influence of heat exhausted from the individual air conditioner on the environment inside the cabin is suppressed.

According to a first aspect of the present disclosure, a vehicle cabin air conditioning system includes a cabin indoor air conditioner for conditioning air inside the cabin, and an individual air conditioner for conditioning air in a target space predetermined air inside the cabin.

The individual air conditioner has a blower, a heat generator, a supply port, and an exhaust port. The blower is arranged inside the housing. The heat generator concurrently generates cold heat for cooling air blown by the blower and warm heat for heating the air inside the housing. The supply port supplies at least one of the cold air obtained by cooling the air with the cold heat by the heat generator and the warm air obtained by heating the air with the warm heat by the heat generator to the target space. The exhaust port sends at least the other of the cold air and the warm air to the outside of the target space.

The cabin indoor air conditioner includes a cabin blower, a temperature control unit, and a suction port. The cabin blower blows conditioned air to be supplied into the cabin. The temperature control unit adjusts the temperature of the air blown by the cabin blower to make the conditioned air. The temperature of air is adjusted by the temperature control unit, and the air is sucked into the suction port. The vehicle cabin air conditioning system further has an air flow path that guides the air from the exhaust port of the individual air conditioner to the suction port of the cabin indoor air conditioner.

That is, according to the vehicle cabin air conditioning system, it is possible to realize both the overall air conditioning for the interior of the cabin by the cabin indoor air conditioner and the individual air conditioning for the target space in the cabin. As a result, according to the vehicle cabin air conditioning system, it is possible to diversify the air conditioning mode in the cabin and improve the comfort of the occupant in various situations.

According to the vehicle cabin air conditioning system, the exhaust air from the exhaust port of the individual air conditioner can be guided to the suction port of the cabin indoor air conditioner by the air flow path. As a result, the vehicle cabin air conditioning system can adjust the temperature of gas sucked from the suction port by the temperature control unit of the cabin indoor air conditioner.

That is, the vehicle cabin air conditioning system can make the cabin more comfortable for an occupant (for example, suppressing mist during cooling or chill during heating) compared with a case where air exhausted from the individual air conditioner is directly discharged into the cabin.

Further, the load of the exhaust air supplied through the air flow path is simply higher than the load of the air sucked from the suction port. Therefore, the cabin indoor air conditioner can be operated in a high COP state. It is possible to minimize power deterioration of the cabin indoor air conditioner due to exhaust heat of the individual air conditioner.

According to a second aspect of the present disclosure, a vehicle cabin air conditioning system includes a cabin indoor air conditioner for conditioning air in the cabin, and an individual air conditioner for conditioning air in target space predetermined in the cabin.

The individual air conditioner has a blower, a heat generator, a supply port, an exhaust port, and a ventilation flow path. The blower is arranged inside the housing. The heat generator concurrently generates cold heat for cooling air blown by the blower and warm heat for heating the air inside the housing. The supply port supplies at least one of the cold air obtained by cooling the air with the cold heat by the heat generator and the warm air obtained by heating the air with the warm heat by the heat generator to the target space. The exhaust port sends at least the other of the cold air and the warm air to the outside of the target space. The ventilation flow path guides the air passing through the exhaust port to the outside of the cabin.

The cabin indoor air conditioner includes a cabin blower and an inside/outside air control unit. The cabin blower blows conditioned air to be supplied into the cabin. The inside/outside air control unit adjusts the amount of inside air inside the cabin and the amount of outside air outside the cabin, with respect to the air sucked by the cabin blower. Then, the inside/outside air control unit adjusts the amount of outside air in the air sucked by the cabin blower to correspond to the amount of air flowing to the outside of the cabin through the ventilation flow path.

That is, according to the vehicle cabin air conditioning system, it is possible to realize both the overall air conditioning for the interior of the cabin by the cabin indoor air conditioner and the individual air conditioning for the target space in the cabin. As a result, according to the vehicle cabin air conditioning system, it is possible to diversify the air conditioning mode in the cabin and improve the comfort of the occupant in various situations.

According to the vehicle cabin air conditioning system, the air exhausted from the exhaust port of the individual air conditioner can be discharged to the outside of the cabin through the ventilation flow path. As a result, the vehicle cabin air conditioning system can suppress an increase in discomfort for an occupant in the cabin (for example, suppressing mist during cooling or chill during heating) due to air exhausted from the individual air conditioner.

Further, in the vehicle cabin air conditioning system, when exhausting the air from the individual air conditioner to the outside of the cabin by the ventilation flow path, the amount of air flowing to the outside of the cabin is adjusted by the inside/outside air control unit of the cabin indoor air conditioner such that the corresponding amount of outside air can be sucked into the cabin.

As a result, according to the vehicle cabin air conditioning system, it is possible to restrict the interior of the cabin from becoming negative pressure. Thus, an increase in draft air is reduced to restrict an increase in air conditioning load and to restrict odors or the like from entering the cabin. Therefore, it is possible to maintain a comfortable state in the cabin.

According to the third aspect of the present disclosure, a vehicle cabin air conditioning system includes a cabin indoor air conditioner for conditioning air in the cabin and an individual air conditioner for conditioning air in a target space predetermined inside the cabin.

The individual air conditioner has a blower, a heat generator, a supply port, and an exhaust port. The blower is arranged inside the housing. The heat generator concurrently generates cold heat for cooling air blown by the blower and warm heat for heating the air inside the housing. The supply port supplies at least one of the cold air obtained by cooling the air with the cold heat by the heat generator and the warm air obtained by heating the air with the warm heat by the heat generator to the target space. The exhaust port sends at least the other of the cold air and the warm air to the outside of the target space.

The cabin indoor air conditioner includes a cabin blower, an inside/outside air control unit, and a temperature control unit. The cabin blower blows conditioned air to be supplied into the cabin. The inside/outside air control unit adjusts the amount of inside air inside the cabin and the amount of outside air outside the cabin with respect to the air sucked by the cabin blower. The temperature control unit adjusts the temperature of the air sucked through the inside/outside air control unit to make the conditioned air.

The vehicle cabin air conditioning system has a switching mechanism and an exhaust control unit. The switching mechanism is provided to switch the air sent from the exhaust port of the individual air conditioner to flow into the air flow path to be guided to the temperature control unit of the cabin indoor air conditioner or the ventilation flow path to be guided to the outside of the cabin. The exhaust control unit controls the operation of the switching mechanism based on the exhaust load related to the air sent from the exhaust port and the outside air load related to the outside air. When the outside air load is larger than the exhaust load, the exhaust control unit controls the operation of the switching mechanism so as to switch the air sent from the exhaust port to flow into the air flow path.

According to the vehicle cabin air conditioning system, it is possible to achieve both the overall air conditioning for the interior of the cabin by the cabin indoor air conditioner and the individual air conditioning for the target space in the cabin. As a result, according to the vehicle cabin air conditioning system, it is possible to diversify the air conditioning mode in the cabin and improve the comfort of the occupant in various situations.

According to the vehicle cabin air conditioning system, the exhaust control unit controls the switching mechanism in response to the exhaust load and the outside air load so that the air exhausted from the individual air conditioner is controlled to flow into the air flow path or the ventilation flow path.

The vehicle cabin air conditioning system can adjust the temperature of the exhaust air by supplying the exhaust air to the temperature control unit of the cabin indoor air conditioner by setting the air exhausted from the individual air conditioner to flow into the air flow path. As a result, the vehicle cabin air conditioning system suppresses the discomfort of the occupant in the cabin (for example, restricting mist during cooling or chill during heating) compared to a case where the exhaust air is directly discharged into the cabin.

Further, in the vehicle cabin air conditioning system, the exhaust air can be discharged to the outside of the cabin by setting the exhaust air of the individual air conditioner to flow into the ventilation flow path. As a result, the vehicle cabin air conditioning system can suppress an increase in discomfort of an occupant in the cabin (for example, restricting mist during cooling or chill during heating) due to air exhausted from the individual air conditioner.

According to the vehicle cabin air conditioning system, when the outside air load is greater than the exhaust load, the air from the exhaust port is switched to flow into the air flow path, and the temperature control unit of the cabin indoor air conditioner adjusts the temperature of the exhaust air to be supplied to the cabin. As a result, the vehicle cabin air conditioning system can suppress the influence of the exhaust air from the individual air conditioner in response to the conditions of the exhaust load and the outside air load so as to minimize the deterioration in power efficiency of the cabin indoor air conditioner.

Hereinafter, embodiments for implementing the present disclosure will be described referring to drawings. In the respective embodiments, parts corresponding to matters already described in the preceding embodiments are given reference numbers identical to reference numbers of the matters already described. The same description is therefore omitted depending on circumstances. In the case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

Hereinafter, embodiments will be described with reference to the drawings. In the following embodiments, identical or equivalent elements are denoted by the same reference numerals as each other in the drawings.

In order to facilitate understanding of the positional relationship of components in the embodiment, arrows indicating up, down, left, right, front and rear in the drawings represent an example of a standard corresponding to orthogonal coordinate systems (for example, X axis, Y axis, Z axis) in three-dimensional space.

Specifically, the arrows indicating up and down, left and right, and front and rear in the drawings are defined with reference to the viewpoint of an occupant on the seat of the vehicle. In the respective drawings, front side and back side in the depth direction of the paper surface are defined with respect to this position as well. For example, the front side and the back side in the depth direction of the paper surface in FIG. 1 correspond to the left-right direction.

First Embodiment

As shown in FIG. 1, a vehicle cabin air conditioning system AS according to the first embodiment is applied to a hybrid vehicle, and includes a seat air conditioner 1 that conditions air in a seat disposed in a cabin C as a target space, and a cabin indoor air conditioner 60 that conditions air in the entire cabin C.

A ventilation port VO is arranged at the rearmost portion of the cabin C of the hybrid vehicle. The ventilation port VO communicates the inside and the outside of the cabin C with each other, and is configured to allow air to flow in and out of the cabin C.

As shown in FIG. 1, the cabin C is provided with plural seats for passenger P. Each of the seats has a seat bottom and a backrest. The passenger P is on the seat bottom and in front of the backrest. The seats are arranged to be slidable in the front-rear direction within a predetermined range via a seat rail (not shown) arranged on the floor surface F of the cabin.

The seats include a front seat SA and a rear seat SB. The front seat SA is arranged on the front side of the cabin C, and corresponds to, for example, a driver seat or a passenger seat. The rear seat SB is arranged on the rear side of the cabin C and is located behind the front seat SA.

In the vehicle cabin air conditioning system AS according to the first embodiment, as shown in FIG. 1, the seat air conditioner 1 is arranged to the rear seat SB, and the temperature-controlled air is supplied to a target space determined for the rear seat SB. The target space in this case means above the seat bottom of the rear seat SB and in front of the backrest. The target space indicates a range in which the passenger P is seated on the rear seat SB. That is, the seat air conditioner 1 corresponds to an individual air conditioner.

The seat air conditioner 1 supplies air whose temperature is adjusted by a refrigeration cycle device 20 or the like arranged inside the housing 10 to the target space via a supply duct D arranged in the rear seat SB. The seat air conditioner 1 can improve the comfort of the passenger P on the rear seat SB.

The housing 10 of the seat air conditioner 1 is attached to the seat bottom of the rear seat SB by an attachment member (not shown). Therefore, the seat air conditioner 1 is arranged so as to be movable in the front-rear direction with the sliding movement of the rear seat SB.

In the vehicle cabin air conditioning system AS according to the first embodiment, the cabin indoor air conditioner 60 includes a front seat air conditioning unit 61 and a rear seat air conditioning unit 72, to condition air entirely for the cabin C of the hybrid vehicle. The cabin indoor air conditioner 60 has a cabin side refrigeration cycle 82, and supplies the conditioned air A whose temperature is adjusted in the cabin side refrigeration cycle 82 into the cabin C.

As shown in FIG. 1, an exhaust duct 90 is arranged between the seat air conditioner 1 and the rear seat air conditioning unit 72. The exhaust duct 90 has an air flow path through which the exhaust air EA containing the exhaust heat generated in the seat air conditioner 1 flows.

The vehicle cabin air conditioning system AS is configured to suppress the influence of heat exhausted from the seat air conditioner 1 on the internal environment of the cabin C by guiding the exhaust air EA from the seat air conditioner 1 through the exhaust duct 90. A specific configuration of the vehicle cabin air conditioning system AS will be described with reference to the drawings.

Figure 2:
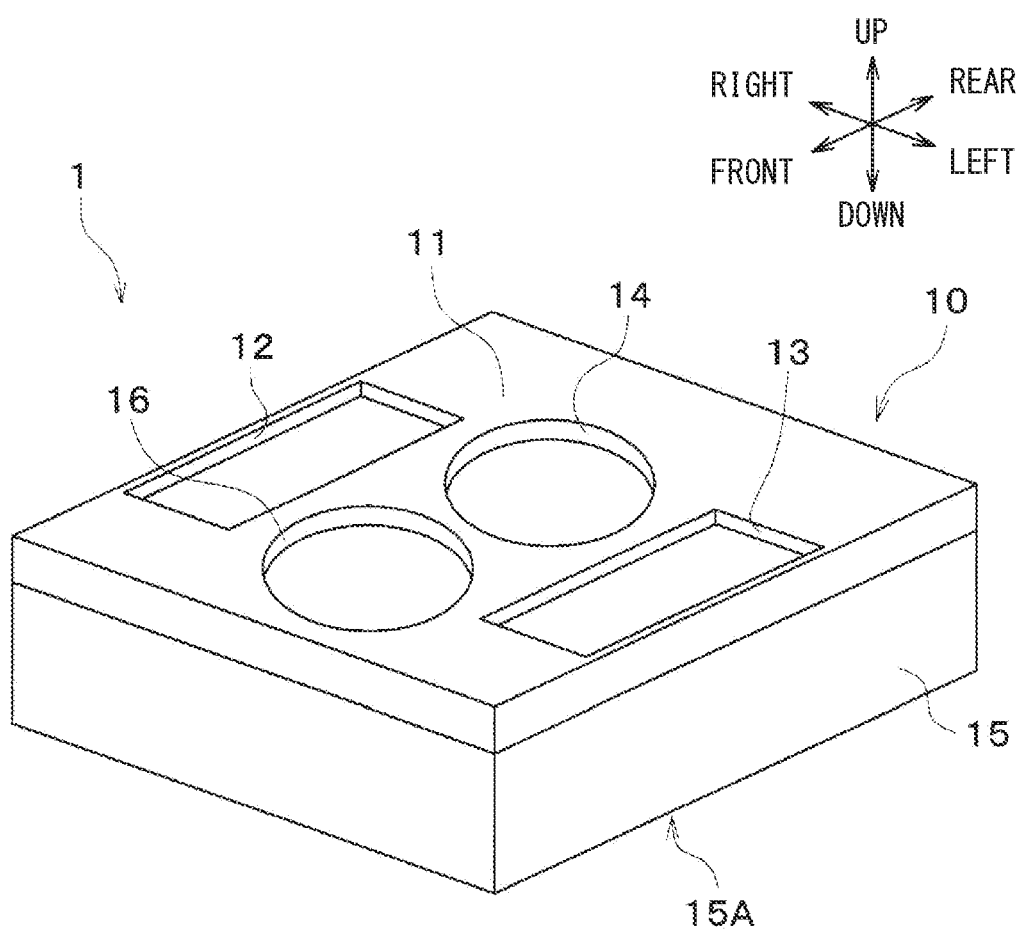
FIG. 2 is a perspective view of a seat air conditioner in the vehicle cabin air conditioning system.
Figure 3:
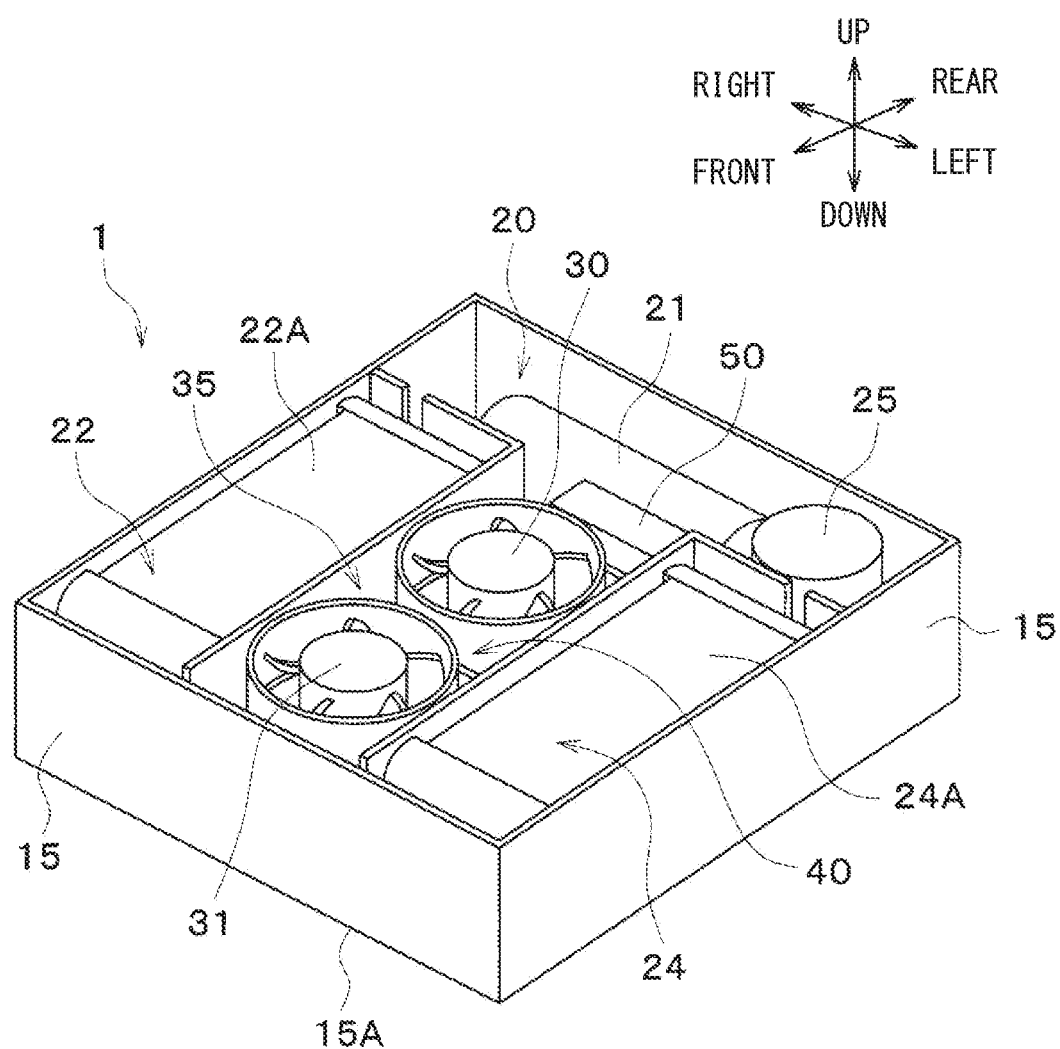
FIG. 3 is a perspective view showing the seat air conditioner in which an upper cover is removed.
Figure 4:
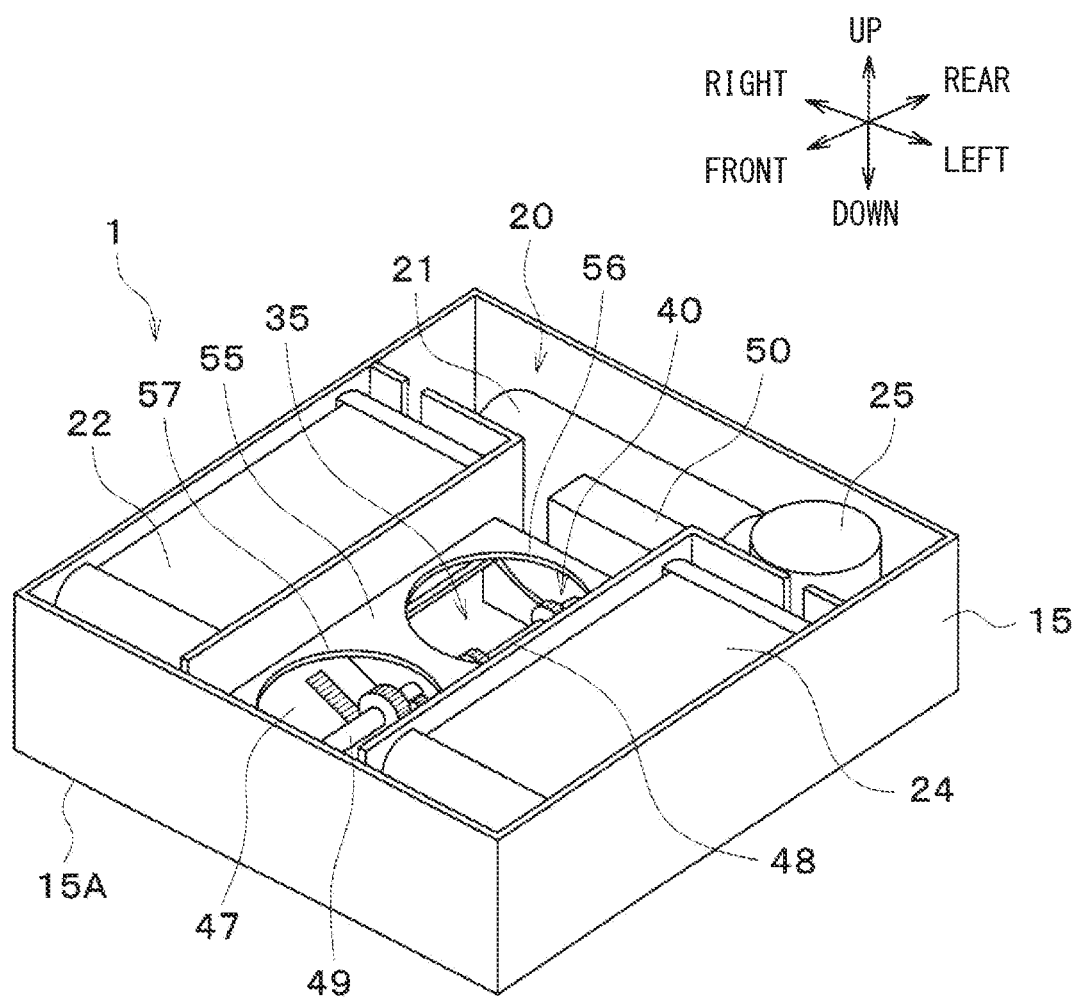
FIG. 4 is a perspective view showing the seat air conditioner in which a first blower and a second blower are removed.

A specific configuration of the seat air conditioner 1 of the vehicle cabin air conditioning system AS will be described in detail with reference to FIGS. 2 to 10. As shown in FIGS. 2 to 4, the seat air conditioner 1 includes a vapor compression refrigeration cycle device 20, a first blower 30, a second blower 31, a warm air switching unit 35, and a cold air switching unit 40, which are housed inside the housing 10.

The refrigeration cycle device 20 of the seat air conditioner 1 can adjust the temperature of air blown by the operation of the first blower 30 and the second blower 31. The seat air conditioner 1 supplies the temperature-controlled air (for example, warm air WA, cold air CA) to the passenger P on the rear seat SB via the supply duct D arranged in the rear seat SB.

A specific configuration of the housing 10 will be described with reference to FIGS. 2 to 4. FIG. 3 shows a state in which the upper cover 11 is removed from FIG. 2, and FIG. 4 shows a state in which the first blower 30 and the second blower 31 are removed from FIG. 3.

The housing 10 of the seat air conditioner 1 is formed in a rectangular parallelepiped shape that can be arranged between the seat bottom of the rear seat SB and the cabin floor surface F. As shown in FIG. 2, the housing 10 has the upper cover 11 and the case body 15.

The upper cover 11 constitutes the upper surface of the housing 10, and is attached so as to close the opening of the box-shaped case body 15 having an open top. The upper cover 11 has a warm air vent 12, a cold air vent 13, a supply port 14, and an exhaust port 16.

The warm air vent 12 is opened in the right side of the upper cover 11. The warm air vent 12 is a ventilation port for sucking air outside the housing 10 (that is, air in the cabin C) into the housing 10 in response to the operation of the first blower 30.

As shown in FIGS. 2 to 10, a condenser 22 of the refrigeration cycle device 20 is arranged at a position below the warm air vent 12 inside the housing 10. The air sucked from the warm air vent 12 is heated by exchanging heat with high-pressure refrigerant when passing through the condenser 22, and is supplied as the warm air WA.

The cold air vent 13 is opened in the left side of the upper cover 11, and is arranged so as to be symmetrical to the warm air vent 12. Similar to the warm air vent 12, the cold air vent 13 is a ventilation port for sucking air outside the housing 10 into the inside with the operation of the first blower 30 and the like.

An evaporator 24 of the refrigeration cycle device 20 is arranged in a position below the cold air vent 13 inside the housing 10. The air sucked from the cold air vent 13 is cooled when passing through the evaporator 24 and supplied as the cold air CA.

The supply port 14 is opened at the rear-side center of the upper cover 11. The supply port 14 is a ventilation port for supplying air (for example, warm air WA, cold air CA) whose temperature is adjusted by the refrigeration cycle device 20 in the seat air conditioner 1 to the target space.

One end of the supply duct D is connected to the supply port 14. The supply duct D is arranged along both sides of the seat bottom and the backrest of the rear seat SB, and is configured to guide the warm air WA and the cold air CA to the space for the passenger P on the rear seat SB.

The exhaust port 16 is opened at the front-side center of the upper cover 11. The exhaust port 16 is an opening through which a part of air whose temperature is adjusted by the refrigeration cycle device 20 inside the housing 10 is discharged as exhaust air.

In the vehicle cabin air conditioning system AS, one end of the exhaust duct 90 is connected to the exhaust port 16 of the seat air conditioner 1. The exhaust air EA blown out from the exhaust port 16 is sent to the outside of the target space via the exhaust duct 90.

The case body 15 constitutes a main part of the housing 10, and is formed in a box shape with an open top. As shown in FIGS. 3 to 10, components such as the refrigeration cycle device 20 and the first blower 30 are arranged inside the case body 15.

Figure 6:
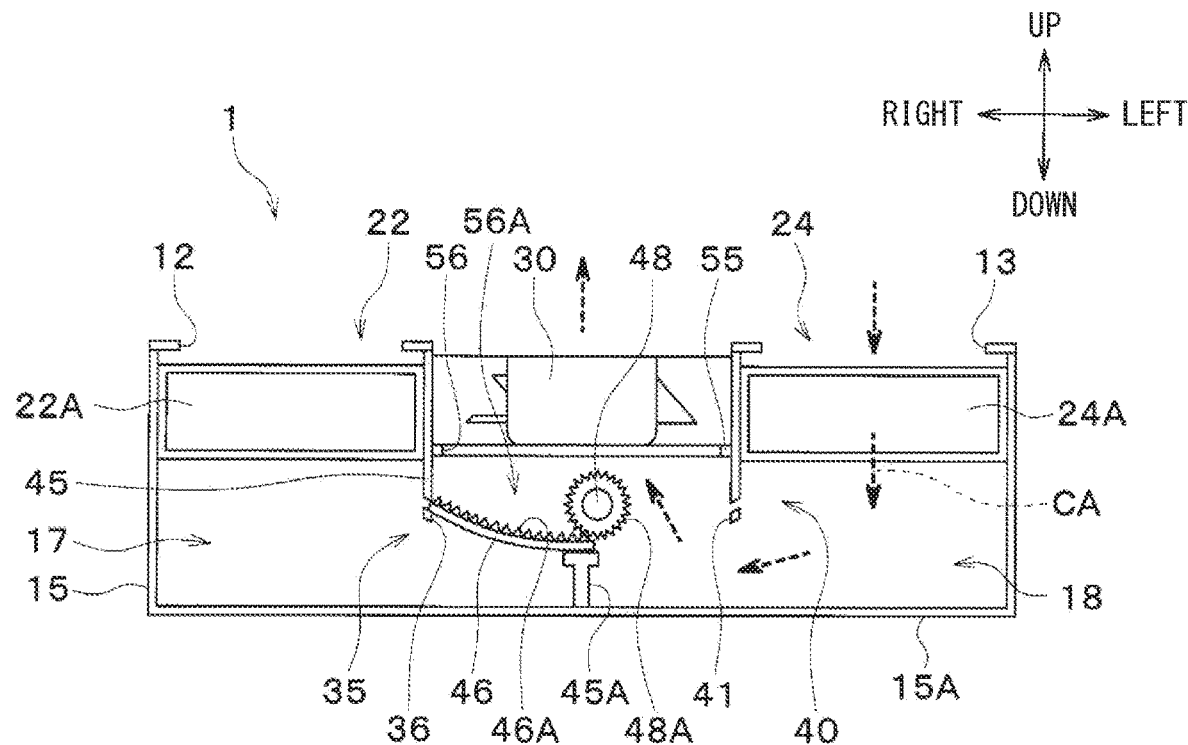
FIG. 6 is a cross-sectional view taken along a line VI-VI in FIG. 5.
Figure 7:
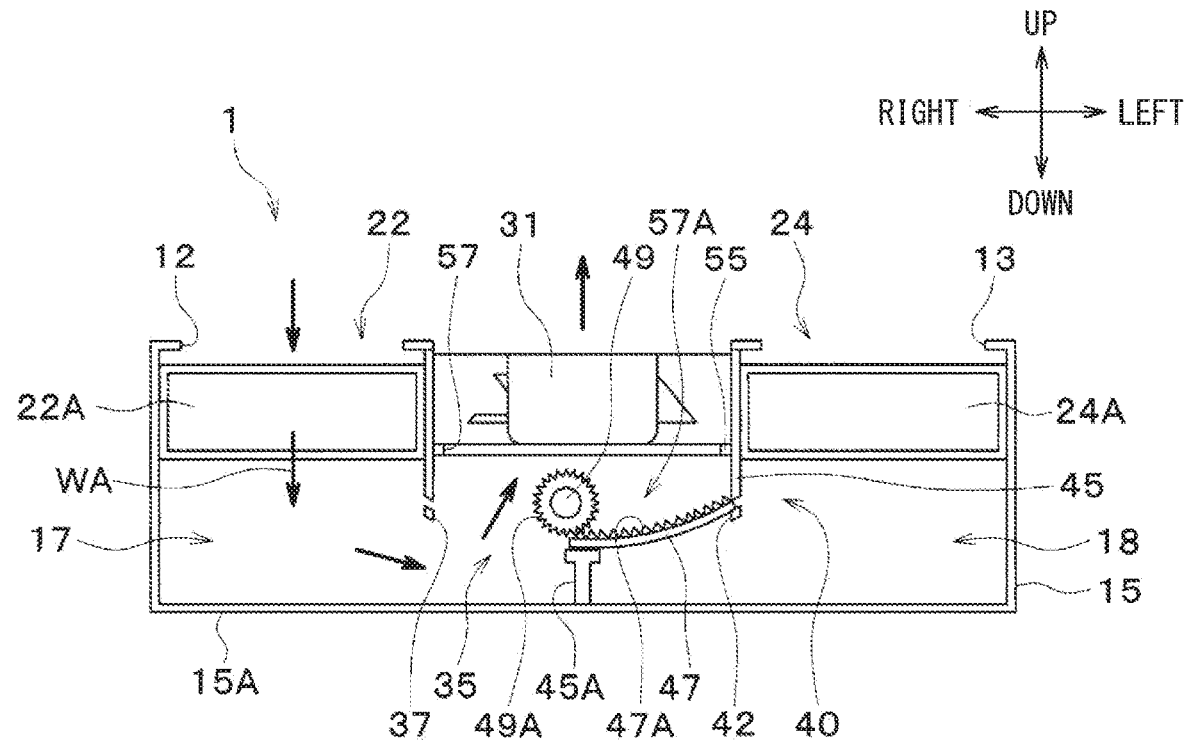
FIG. 7 is a cross-sectional view taken along a line VII-VII in FIG. 5.

As shown in FIGS. 6 and 7, a warm air passage 17 and a cold air passage 18 are formed inside the case body 15. The warm air WA heated by the condenser 22 flows through the warm air passage 17. The cold air CA cooled by the evaporator 24 flows through the cold air passage 18. Each of the warm air passage 17 and the cold air passage 18 is configured between the housing bottom surface 15A of the case body 15 and the component.

As shown in FIG. 1, the housing 10 is arranged at a distance from the lower surface of the seat bottom of the rear seat SB. Therefore, one end of the supply duct D and one end of the exhaust duct 90 can be arranged on the supply port 14 and the exhaust port 16 defined in the upper surface of the housing 10.

Next, the configuration of the refrigeration cycle device 20 in the seat air conditioner 1 will be described with reference to the drawings. The refrigeration cycle device 20 is housed inside the housing 10 to form a vapor compression refrigeration cycle.

The refrigeration cycle device 20 includes a compressor 21, the condenser 22, a pressure reducing unit 23, the evaporator 24, and an accumulator 25. The refrigeration cycle device 20 cools or heats air blown to the target space of the rear seat SB by circulating refrigerant by the operation of the compressor 21. The refrigeration cycle device 20 corresponds to a heat generator that generates warm heat in the condenser 22 and cold heat in the evaporator 24 in parallel at the same time.

The refrigeration cycle device 20 employs an HFC-based refrigerant (specifically, R134a) as a refrigerant, and forms a vapor compression subcritical refrigeration cycle in which the high-pressure side refrigerant pressure does not exceed the critical pressure of refrigerant. HFO refrigerant (e.g., R1234yf) or a natural refrigerant (e.g., R744) may be employed as the refrigerant. Refrigerant oil for lubricating the compressor 21 is mixed into the refrigerant and a part of the refrigerant oil circulates through the cycle together with the refrigerant.

In the refrigeration cycle device 20, the compressor 21 draws, compresses, and discharges the refrigerant. The compressor 21 is configured as an electric compressor in which a fixed displacement type compression mechanism having a fixed discharge capacity is driven by an electric motor. As shown in FIGS. 3 and 4, the compressor 21 is located at the rear side in the case body 15. As the compression mechanism of the compressor 3, various compression mechanisms such as a scroll compression mechanism and a vane compression mechanism can be employed.

The operation (rotation number) of the electric motor of the compressor 21 is controlled by a control signal outputted from an air conditioning control unit 100 to be described later. A refrigerant discharge capacity of the compressor 21 is changed by controlling the rotation speed of the electric motor by the air conditioning control unit 100.

The inlet of the condenser 22 is connected to the discharge pipe through which the high-pressure refrigerant compressed by the compressor 21 is discharged. The condenser 22 has a heat exchange section 22A configured by stacking tubes and fins in a flat plate shape. Heat is exchanged between air passing through the heat exchange section 22A and the high-pressure refrigerant flowing through each of the tubes.

Figure 5:
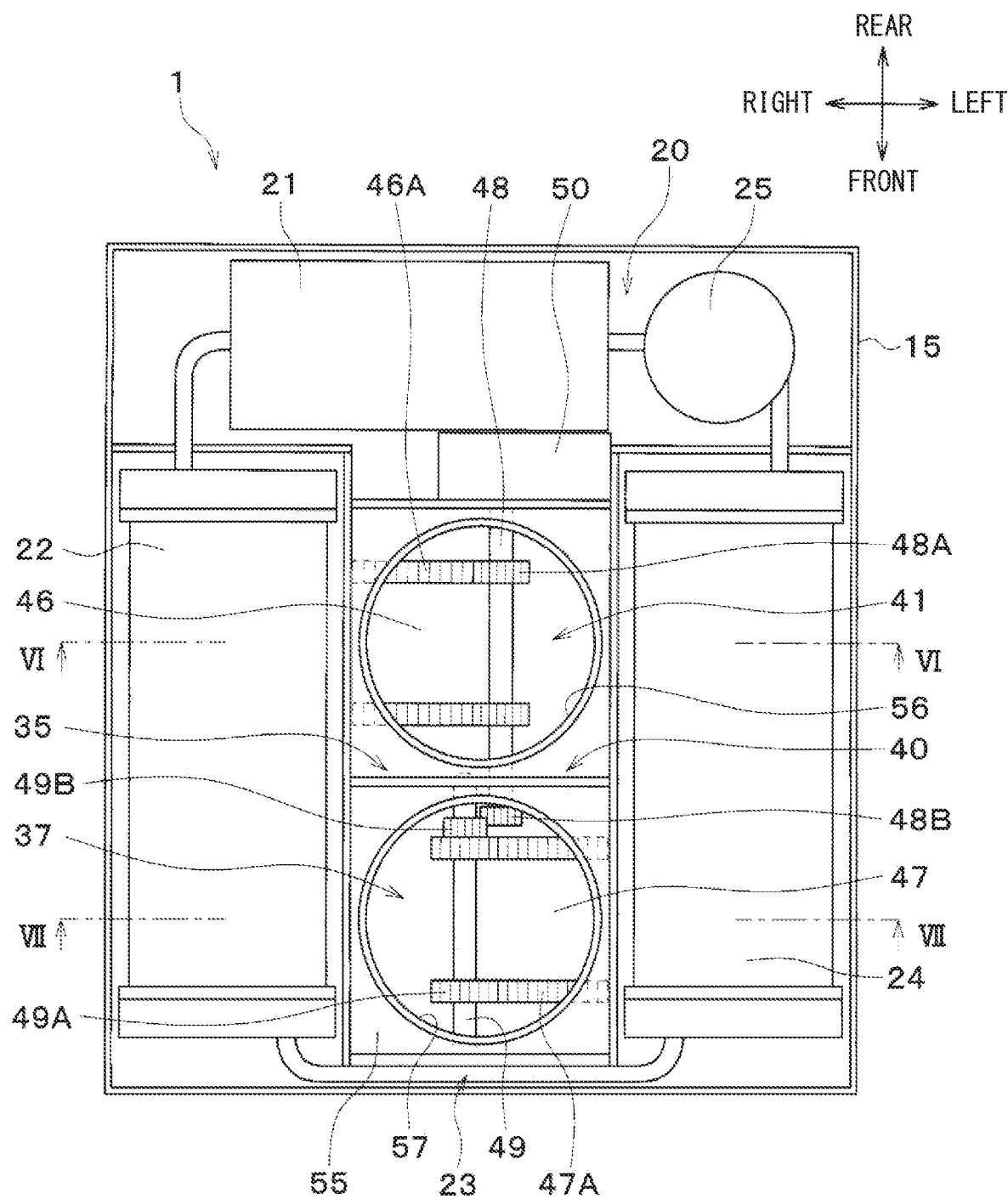
FIG. 5 is a plan view showing an internal configuration of the seat air conditioner.

As shown in FIGS. 3 to 5, the condenser 22 is disposed on the right side of the case body 15, and is located below the warm air vent 12. The air sucked from the warm air vent 12 passes through the heat exchange section 22A of the condenser 22.

That is, heat is exchanged in the condenser 22 between the high-temperature and high-pressure refrigerant discharged from the compressor 21 and the air sucked from the warm air vent 12. Thus, the air is heated and provided as the warm air WA. That is, the condenser 22 operates as a heat exchanger for heating and functions as a radiator.

The heat exchange section 22A of the condenser 22 is formed in a flat plate shape having a longitudinal direction corresponding to the extending direction of the tubes and fins. As shown in FIGS. 3 to 10, the condenser 22 is arranged such that the longitudinal direction of the heat exchange section 22A is along the front-rear direction of the seat air conditioner 1.

As shown in FIGS. 6 and 7, the condenser 22 is arranged such that the heat exchange section 22A is located above the housing bottom surface 15A by a predetermined distance. The warm air WA that has passed through the heat exchange section 22A flows through a space formed below the condenser 22, and the space functions as a part of the warm air passage 17.

The pressure reducing unit 23 is connected to the outlet side of the condenser 22. The pressure reducing unit 23 is configured by a so-called fixed throttle, and decompresses the refrigerant flowing out from the condenser 22. As shown in FIG. 5, the pressure reducing unit 23 is arranged on the front side inside the case body 15.

In the seat air conditioner 1, a fixed throttle is used as the pressure reducing unit 23, but is not limited to this. Various structures can be used as the pressure reducing unit that can reduce the pressure of the refrigerant flowing out of the condenser 22. For example, a capillary tube may be adopted as the pressure reducing unit 23, or an expansion valve whose throttle opening can be controlled by a control signal from the control unit may be used as the pressure reducing unit 23.

The inlet side of the evaporator 24 is connected to the outlet side of the pressure reducing unit 23. The evaporator 24 has a heat exchange section 24A configured by stacking tubes and fins in a flat plate shape, to absorb heat from the air passing through the heat exchange section 24A, such that the low-pressure refrigerant flowing in each of the tubes is evaporated.

As shown in FIGS. 3 to 5, the evaporator 24 is arranged on the left side of the case body 15 and is located below the cold air vent 13. Therefore, in the seat air conditioner 1, the evaporator 24 is arranged inside the housing 10 with a space with respect to the condenser 22 in the left-right direction.

The air sucked from the cold air vent 13 passes through the heat exchange section 24A of the evaporator 24. That is, in the evaporator 24, heat is exchanged between the air sucked from the cold air vent 13 and the low-pressure refrigerant decompressed by the pressure reducing unit 23, such that the air is cooled into the cold air CA. In other words, the evaporator 24 operates as a heat exchanger for cooling and functions as a heat absorber.

The heat exchange section 24A of the evaporator 24 is formed in a flat plate shape having the longitudinal direction corresponding to the extending direction of the tubes and fins. As shown in FIGS. 3 to 7, the evaporator 24 is arranged such that the longitudinal direction of the heat exchange section 24A is along the front-rear direction of the seat air conditioner 1.

As shown in FIGS. 6 and 7, the evaporator 24 is arranged such that the heat exchange section 24A is located above the housing bottom surface 15A by a predetermined distance. The cold air CA that has passed through the heat exchange section 24A flows in a space formed below the evaporator 24, and the space functions as a part of the cold air passage 18.

The accumulator 25 is connected to the outlet side of the evaporator 24, and is arranged on the left and rear side of the case body 15. The accumulator 25 separates the gas/liquid of the refrigerant flowing out from the evaporator 24, and stores the excess liquid phase refrigerant in the refrigeration cycle.

A suction pipe of the compressor 21 is connected to a gas-phase refrigerant outlet of the accumulator 25. The gas-phase refrigerant separated by the accumulator 25 is sucked into the compressor 21 through the suction pipe.

As shown in FIG. 3, the first blower 30 and the second blower 31 are arranged inside the housing 10. The first blower 30 includes an impeller having plural blades and an electric motor that rotates the impeller.

The first blower 30 is located on the rear side between the condenser 22 and the evaporator 24, and is located below the supply port 14. The first blower 30 can blow air to the target space of the rear seat SB via the supply port 14 and the supply duct D by rotating the impeller. That is, the first blower 30 is an example of blower.

The second blower 31 has an impeller and an electric motor, like the first blower 30. As shown in FIG. 3, the second blower 31 is arranged between the condenser 22 and the evaporator 24 so as to be adjacent to the front side of the first blower 30.

The second blower 31 is located below the exhaust port 16. The second blower 31 can blow air to outside of the target space via the exhaust port 16 and the exhaust duct 90 by rotating the impeller. That is, the second blower 31 is an example of blower.

As shown in FIG. 4 and the like, a fan support 55 is arranged below the first blower 30 and the second blower 31. The fan support 55 is arranged between the condenser 22 and the evaporator 24, and has a first mounting opening 56 and a second mounting opening 57. As shown in FIGS. 4 to 7, the fan support 55 is arranged so as to be located at a predetermined height from the housing bottom surface 15A of the housing 10, and defines a space between the condenser 22 and the evaporator 24 into an upper part and a lower part.

The first blower 30 is attached to the first mounting opening 56 arranged on the rear side of the fan support 55. The second blower 31 is attached to the second mounting opening 57 arranged on the front side of the fan support 55 so as to be adjacent to the first mounting opening 56.

The first blower 30 can suck air below the fan support 55 through the first mounting opening 56 and supply the air to the supply port 14. The second blower can take in air below the fan support 55 through the second mounting opening 57 and supply the air to the exhaust port 16.

The configurations of the warm air switching unit 35 and the cold air switching unit 40 in the seat air conditioner 1 will be described with reference to the drawings.

FIG. 6 shows a cross-sectional view taken along a line VI-VI in FIG. 5, and shows an example of the flow of air (cold air CA) by the first blower 30. FIG. 7 shows a cross-sectional view taken along a line VII-VII in FIG. 5, and shows an example of the flow of air (warm air WA) by the second blower 31.

As shown in FIG. 4, the seat air conditioner 1 includes the warm air switching unit 35 and the cold air switching unit 40 between the condenser 22 and the evaporator 24, below the first blower 30 and the second blower 31. The warm air switching unit 35 is a mechanism for switching the destination of the warm air WA heated by the condenser 22. The cold air switching unit 40 is a mechanism for switching the destination of the cold air CA cooled by the evaporator 24.

The warm air switching unit 35 and the cold air switching unit 40 are configured to include a frame member 45 disposed below the fan support 55, a supply slide door 46, an exhaust slide door 47, and a drive motor 50.

That is, the warm air switching unit 35 and the cold air switching unit 40 are arranged inside the housing 10, between the condenser 22 at the right side and the evaporator 24 at the left side. The warm air switching unit 35 between the condenser 22 and the evaporator 24 is located on the right side (adjacent to the condenser 22), and the cold air switching unit 40 between the condenser 22 and the evaporator 24 is located on the left side (adjacent to the evaporator 24).

As shown in FIGS. 6 and 7, the frame member 45 is arranged below the fan support 55 between the condenser 22 and the evaporator 24 and extends along the front-rear direction. The frame member 45 is formed in an arc shape that bulges downward with respect to a cross section perpendicular to the front-rear direction.

A partition portion 45A is formed at a lower end portion of the frame member 45 that swells in an arc shape. The partition portion 45A is formed in a wall shape that closes a space between the lower end portion of the frame member 45 and the inner surface of the housing bottom surface 15A, and extends in the front-rear direction. That is, the space below the frame member 45 is divided into left and right by the partition portion 45A.

A space below the frame member 45 at the right side of the partition portion 45A communicates with a space below the condenser 22 and forms a part of the warm air passage 17. Similarly, a space below the frame member 45 at the left side of the partition portion 45A communicates with a space below the evaporator 24 and forms a part of the cold air passage 18.

A partition rib is formed in the center of the frame member 45 in the front-rear direction to partition the space between the fan support 55 and the frame member 45 into front and rear parts. A space on the rear side of the partition rib communicates with the first mounting opening 56 and functions as a supply space 56A into which the air supplied from the supply port 14 flows. A space on the front side of the partition rib communicates with the second mounting opening 57 and functions as an exhaust space 57A into which the air blown from the exhaust port 16 flows.

The warm air supply opening 36 and the warm air exhaust opening 37 that form the warm air switching unit 35 are arranged adjacent to each other in the front-rear direction, on the right side of the partition portion 45A of the frame member 45. The warm air supply opening 36 is formed in the rear and right side of the frame member 45, by which the supply space 56A and the warm air passage 17 communicate with each other. The warm air exhaust opening 37 is formed in the front and right side of the frame member 45, by which the exhaust space 57A and the warm air passage 17 communicate with each other.

As shown in FIGS. 6 and 7, the frame member 45 is formed in an arc shape that bulges downward as going to the center in the left-right direction. The warm air supply opening 36 and the warm air exhaust opening 37 are open at the right side of the frame member 45.

Therefore, the opening edges of the warm air supply opening 36 and the warm air exhaust opening 37 are formed so as to draw a downward arc as separating away from the right side of the housing 10 where the condenser 22 is arranged. As a result, the opening area of the warm air supply opening 36 and the warm air exhaust opening 37 is larger than that in case where, for example, the warm air supply openings 36 and the like is formed to cross the warm air passage 17 in the left-right direction (that is, horizontally).

As shown in FIGS. 5 to 7, the condenser 22 is arranged such that the longitudinal direction of the heat exchange section 22A is along the front-rear direction. In the warm air switching unit 35, the warm air supply opening 36 and the warm air exhaust opening 37 are arranged side by side in the front-rear direction.

As a result, in the seat air conditioner 1, with respect to the air that has passed through the heat exchange section 22A of the condenser 22, both the air volume that flows into the warm air supply opening 36 and the air volume that flows into the warm air exhaust opening 37 can be secured enough.

The cold air supply opening 41 and the cold air exhaust opening 42 that form the cold air switching unit 40 are arranged adjacent to each other in the front-rear direction, on the left side of the partition portion 45A in the frame member 45.

The cold air supply opening 41 is formed on the left and rear side of the frame member 45, by which the supply space 56A and the cold air passage 18 communicate with each other. As shown in FIG. 6, in the frame member 45, the cold air supply opening 41 is adjacent to the warm air supply opening 36 in the left-right direction.

The cold air exhaust opening 42 is formed on the left and front side of the frame member 45, by which the exhaust space 57A and the cold air passage 18 communicate with each other. As shown in FIG. 7, the cold air exhaust opening 42 is adjacent to the warm air exhaust opening 37 in the left-right direction, in the frame member 45.

The frame member 45 is formed in an arc shape that bulges downward toward the center in the left-right direction. The cold air supply opening 41 and the cold air exhaust opening 42 are formed on the left side of the frame member 45.

Therefore, the opening edges of the cold air supply opening 41 and the cold air exhaust opening 42 are formed so as to draw downward arc as separating away from the left side of the housing 10 where the evaporator 24 is arranged. Accordingly, the opening area of the cold air supply opening 41 and the cold air exhaust opening 42 is larger than that in case where the cold air supply opening 41 and the like are formed to cross the cold air passage 18 in the left-right direction (that is, horizontally).

As shown in FIGS. 5 to 7, the evaporator 24 is arranged such that the longitudinal direction of the heat exchange section 24A is along the front-rear direction. In the cold air switching unit 40, the cold air supply opening 41 and the cold air exhaust opening 42 are arranged side by side in the front-rear direction.

As a result, in the seat air conditioner 1, with respect to the air that has passed through the heat exchange section 24A of the evaporator 24, the air volume that flows into the cold air supply opening 41 and the air volume that flows into the cold air exhaust opening 42 can be secured.

The supply slide door 46 is movably attached to the rear side of the frame member 45. The supply slide door 46 is formed in a plate shape curved along the arc of the frame member 45, and has a size capable of closing the warm air supply opening 36 or the cold air supply opening 41.

The supply slide door 46 is slidably attached along the arc of the frame member 45 between the position where the warm air supply opening 36 is closed and the position where the cold air supply opening 41 is closed.

Therefore, in the seat air conditioner 1, the volume of the warm air WA flowing into the supply space 56A through the warm air supply opening 36 and the volume of the cold air CA flowing into the supply space 56A through the cold air supply opening 41 can be adjusted by moving the supply slide door 46. That is, the supply slide door 46 can adjust the proportion of the warm air WA and the cold air CA in the air supplied from the supply port 14.

The exhaust slide door 47 is movably attached to the front side of the frame member 45. The exhaust slide door 47 is formed in a plate shape curved along the arc of the frame member 45, and has a size capable of closing the warm air exhaust opening 37 or the cold air exhaust opening 42.

The supply slide door 46 is slidably attached along the arc of the frame member 45 between the position where the warm air exhaust opening 37 is closed and the position where the cold air exhaust opening 42 is closed.

Therefore, in the seat air conditioner 1, the volume of the warm air WA flowing into the exhaust space 57A through the warm air exhaust opening 37 and the volume of the cold air CA flowing into the exhaust space 57A through the cold air exhaust opening 42 can be adjusted by moving the exhaust slide door 47. That is, the exhaust slide door 47 can adjust the proportion of the warm air WA and the cold air CA in the air blown from the exhaust port 16.

As shown in FIG. 5 and the like, the drive motor 50 is arranged inside the housing 10. The drive motor 50 is a so-called servo motor, and functions as a drive source for slidingly moving the supply slide door 46 and the exhaust slide door 47. The drive motor 50 is operated based on a control signal from the air conditioning control unit 100.

A supply shaft 48 is connected to the drive shaft of the drive motor 50. The supply shaft 48 extends frontward from the drive motor 50 and has two gears 48A. The supply shaft 48 is arranged so as to traverse above the supply slide door 46 in the front-rear direction.

The upper surface of the supply slide door 46 has two tooth portions 46A extending in the left-right direction. The tooth portion 46A of the supply slide door 46 is formed so as to mesh with the teeth of the gear 48A of the supply shaft 48.

Therefore, the power generated by the drive motor 50 is transmitted to the supply slide door 46 via the gear 48A and the tooth portion 46A. That is, in the seat air conditioner 1, the supply slide door 46 can slide to a position in the left-right direction by controlling the operation of the drive motor 50 by the air conditioning control unit 100.

An exhaust shaft 49 is rotatably supported on the front side of the supply shaft 48. The exhaust shaft 49 extends frontward parallel to the supply shaft 48, and has two gears 49A.

As shown in FIG. 5, a transmission gear 48B is arranged at the front end portion of the supply shaft 48 and is configured to mesh with a driven gear 49B arranged at the rear end portion of the exhaust shaft 49. Therefore, the power generated by the drive motor 50 is transmitted to the exhaust shaft 49 as the supply shaft 48 rotates.

Two tooth portions 47A are arranged on the upper surface of the exhaust slide door 47 so as to extend in the left-right direction. The tooth portion 47A of the exhaust slide door 47 is formed so as to mesh with the gear 49A of the exhaust shaft 49.

Therefore, the power generated by the drive motor 50 is transmitted through the supply shaft 48 to rotate the exhaust shaft 49. As a result, the exhaust slide door 47 slides between the warm air exhaust opening 37 and the cold air exhaust opening 42. That is, in the seat air conditioner 1, the exhaust slide door 47 can slide to a position in the left-right direction by controlling the operation of the drive motor 50 by the air conditioning control unit 100.

According to the seat air conditioner 1, the power of the drive motor 50 can be transmitted to the supply slide door 46 and the exhaust slide door 47 via the supply shaft 48 and the exhaust shaft 49. As a result, the seat air conditioner 1 can interlock the slide movement of the supply slide door 46 and the slide movement of the exhaust slide door 47.

As shown in FIGS. 5 to 10, when the exhaust slide door 47 moves so that the opening area of the cold air exhaust opening 42 increases, the supply slide door 46 moves to increase the opening area of the warm air supply opening 36.

In this case, when the air volume ratio of the cold air CA in the air flowing into the exhaust space 57A increases, the air volume ratio of the warm air WA in the air flowing into the supply space 56A increases. The seat air conditioner 1 can supply air to the target space at a temperature lower than that in the heating mode and higher than that in the cooling mode, so as to realize an air mix mode closer to a heating operation.

When the exhaust slide door 47 moves so that the opening area of the warm air exhaust opening 37 increases, the supply slide door 46 moves so that the opening area of the cold air supply opening 41 increases.

In this case, when the air volume ratio of the warm air WA in the air flowing into the exhaust space 57A increases, the air volume ratio of the cold air CA in the air flowing into the supply space 56A increases. The seat air conditioner 1 can supply air to the target space at a temperature lower than that of the heating mode and higher than that of the cooling mode, so as to realize an air mix mode closer to a cooling operation.

According to the seat air conditioner 1 of the first embodiment, air whose temperature is adjusted appropriately can be supplied to the target space of the rear seat SB using the warm air WA heated by the condenser 22 of the refrigeration cycle device 20 and the cold air CA cooled by the evaporator 24.

According to the seat air conditioner 1, it is possible to realize the cooling mode, the heating mode, and the air mix mode by controlling the operations of the warm air switching unit 35 and the cold air switching unit 40. The cooling mode is set for supplying the cold air CA to the target space. The heating mode is set for supplying the warm air WA to the target space. The air mix mode is set for supplying air to the target space, in which the temperature of the air is controlled by mixing the cold air CA and the warm air WA.

Next, the operation of the seat air conditioner 1 in the cooling mode will be described with reference to FIGS. 5 to 7. In the cooling mode, the air conditioning control unit 100 closes the warm air supply opening 36 with the supply slide door 46 and closes the cold air exhaust opening 42 with the exhaust slide door 47, by controlling the warm air switching unit 35 and the cold air switching unit 40.

When the first blower 30 is operated in this state, as shown in FIG. 6, the air flows in order of the cold air vent 13, the evaporator 24, the cold air passage 18, the cold air supply opening 41, the supply space 56A, the first blower 30, and the supply port 14. As a result, the cold air CA cooled by the cold heat of the evaporator 24 is supplied from the supply port 14 to the target space of the rear seat SB.

In the cooling mode, the warm air supply opening 36 is closed by the supply slide door 46. Therefore, in this case, the first blower 30 does not produce a flow of air flowing in order of the warm air vent 12, the condenser 22, the warm air passage 17, and the warm air supply opening 36.

In the cooling mode of the seat air conditioner 1, the cold air CA is generated by cooling the air blown by the first blower 30 by heat exchange with the low-pressure refrigerant in the evaporator 24. That is, the heat absorption amount of the refrigerant in the evaporator 24 of the refrigeration cycle device 20 is greatly affected by the amount of air blown by the first blower 30. In other words, the seat air conditioner 1 can adjust the heat absorption amount of the refrigerant in the evaporator 24 by adjusting the air flow rate of the first blower 30 in the cooling mode.

When the second blower 31 is operated in the cooling mode, as shown in FIG. 7, the air flows in order of the warm air vent 12, the condenser 22, the warm air passage 17, the warm air exhaust opening 37, the exhaust space 57A, the second blower 31, and the exhaust port 16. As a result, the warm air WA heated by the warm heat of the condenser 22 is blown from the exhaust port 16 to outside of the target space via the exhaust duct 90.

In the cooling mode, the cold air exhaust opening 42 is closed by the exhaust slide door 47. Therefore, in this case, the second blower 31 does not cause a flow of air flowing in order of the cold air vent 13, the evaporator 24, the cold air passage 18, and the cold air exhaust opening 42.

In the cooling mode of the seat air conditioner 1, the warm air WA is generated by heating the air blown by the second blower 31 with the heat of the high-pressure refrigerant in the condenser 22. That is, the heat radiation amount of the refrigerant in the condenser 22 of the refrigeration cycle device 20 is greatly affected by the air blowing amount of the second blower 31. In other words, the seat air conditioner 1 can adjust the heat radiation amount of the refrigerant in the condenser 22 by adjusting the air flow amount of the second blower 31 in the cooling mode.

As described above, in the seat air conditioner 1, the cold air CA cooled by the evaporator 24 is supplied from the supply port 14 to the target space of the rear seat SB by the first blower 30, and the warm air WA heated by the condenser 22 can be exhausted from the exhaust port 16 by the second blower 31. That is, the seat air conditioner 1 can realize a cooling mode in which the cold air CA is supplied to the target space of the rear seat SB.

According to the seat air conditioner 1, the heat absorption amount of the refrigerant in the evaporator 24 can be adjusted by adjusting the amount of air blown by the first blower 30 in the cooling mode. Further, the seat air conditioner 1 can adjust the heat radiation amount of the refrigerant in the condenser 22 by adjusting the amount of air blown by the second blower 31.

Accordingly, the seat air conditioner 1 can appropriately adjust the heat radiation amount of the refrigerant in the condenser 22 and the heat absorption amount of the refrigerant in the evaporator 24 in the cooling mode. Thus, the refrigeration cycle device 20 can be easily balanced and stably operated.

The first blower 30 in the cooling mode functions as a blower for supplying the conditioned air to the target space, and at the same time, functions as a blower for sending the cold air CA. That is, the first blower 30 sucks air through the evaporator 24 as at least one of the condenser 22 and the evaporator 24.

The second blower 31 in this case is an exhaust blower for blowing air to the outside of the target space, and at the same time functions as a warm air blower for blowing the warm air WA. That is, the second blower 31 sucks air through the condenser 22 as at least the other of the condenser 22 and the evaporator 24.

Next, the operation of the seat air conditioner 1 in the heating mode will be described with reference to FIGS. 8 to 10. In the heating mode, the air conditioning control unit 100 closes the cold air supply opening 41 with the supply slide door 46, and closes the warm air exhaust opening 37 with the exhaust slide door 47 by controlling the warm air switching unit 35 and the cold air switching unit 40.

Figure 9:
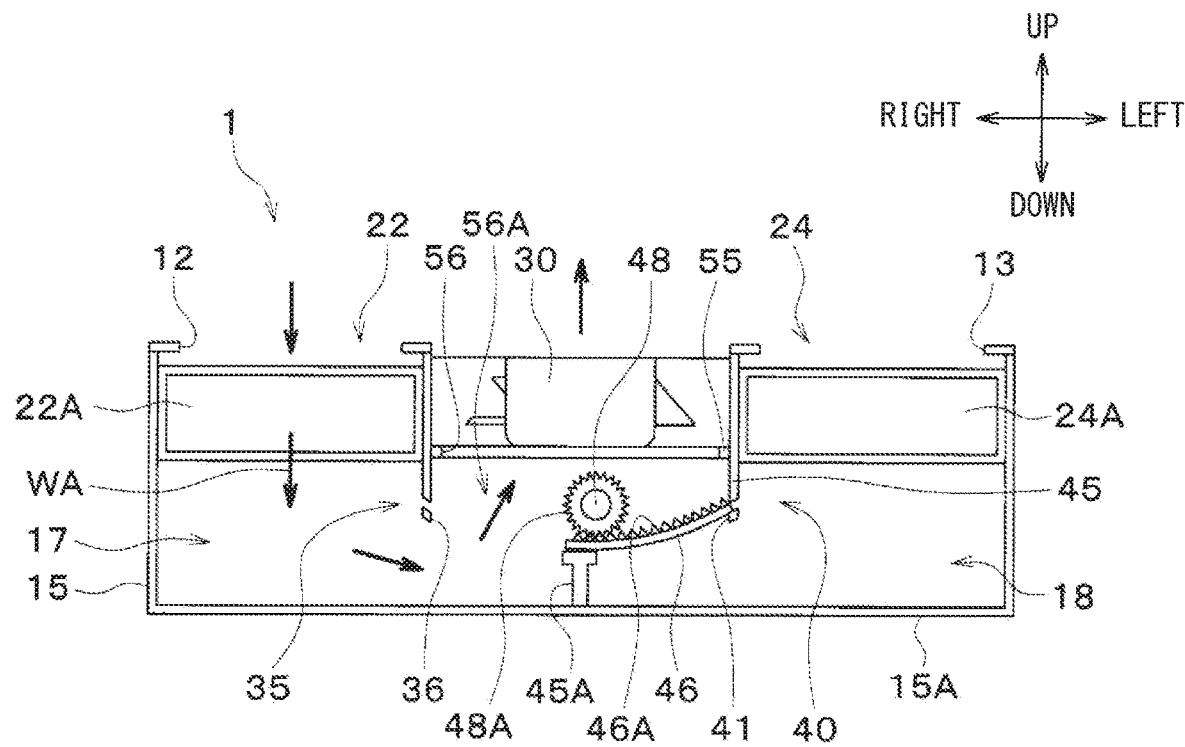
FIG. 9 is a cross-sectional view taken along a line IX-IX in FIG. 8.

As shown in FIG. 9, when the first blower 30 is operated in the heating mode, the air flows in order of the warm air vent 12, the condenser 22, the warm air passage 17, the warm air supply opening 36, the supply space 56A, the first blower 30, and the supply port 14. As a result, the warm air WA heated by the warm heat of the condenser 22 is supplied from the supply port 14 to the target space of the rear seat SB.

In the heating mode, the cold air supply opening 41 is closed by the supply slide door 46. Therefore, the first blower 30 does not generate a flow of air flowing in order of the cold air vent 13, the evaporator 24, the cold air passage 18, and the cold air supply opening 41.

Therefore, in the heating mode of the seat air conditioner 1, the warm air WA is generated by heating the air blown by the first blower 30 with the heat of the high-pressure refrigerant in the condenser 22. That is, the heat radiation amount of the refrigerant in the condenser 22 of the refrigeration cycle device 20 is greatly influenced by the air amount blown by the first blower 30. In other words, the seat air conditioner 1 can adjust the heat radiation amount of the refrigerant in the condenser 22 by adjusting the air amount blown by the first blower 30 in the heating mode.

Figure 10:
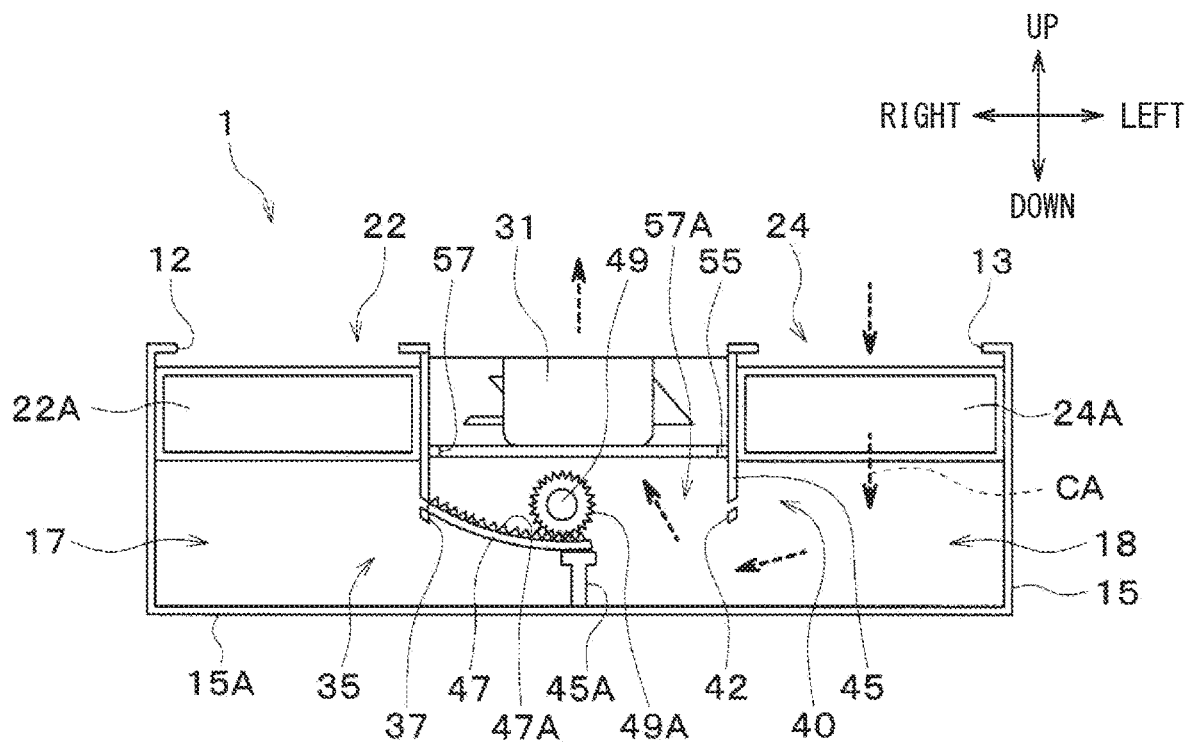
FIG. 10 is a cross-sectional view taken along a line X-X in FIG. 8.

When the second blower 31 is operated in the heating mode, as shown in FIG. 10, the air flows in order of the cold air vent 13, the evaporator 24, the cold air passage 18, the cold air exhaust opening 42, the exhaust space 57A, the second blower 31, and the exhaust port 16. As a result, the cold air CA cooled by the cold heat of the evaporator 24 is blown from the exhaust port 16 through the exhaust duct 90 to the outside of the target space.

In the heating mode, the warm air exhaust opening 37 is closed by the exhaust slide door 47. Therefore, the second blower 31 does not cause a flow of air flowing in order of the warm air vent 12, the condenser 22, the warm air passage 17, and the warm air exhaust opening 37.

Therefore, in the heating mode of the seat air conditioner 1, the cold air CA is generated by absorbing heat in the low-pressure refrigerant in the evaporator 24 with the air blown by the second blower 31. That is, the heat absorption amount of the refrigerant in the evaporator 24 of the refrigeration cycle device 20 is greatly affected by the amount of air blown by the second blower 31. In other words, the seat air conditioner 1 can adjust the heat absorption amount of the refrigerant in the evaporator 24 by adjusting the amount of air blown by the second blower 31 in the heating mode.

As described above, the seat air conditioner 1 supplies the warm air WA heated by the condenser 22 to the target space from the supply port 14 by the first blower 30 and sends the cold air CA cooled by the evaporator 24 by the second blower 31 from the exhaust port 16. That is, the seat air conditioner 1 can realize the heating mode in which the warm air WA is supplied to the seat, which is the target space to be air-conditioned.

According to the seat air conditioner 1, the heat radiation amount of the refrigerant in the condenser 22 can be adjusted by adjusting the air flow rate of the first blower 30 in the heating mode. Further, the seat air conditioner 1 can adjust the amount of heat absorbed by the refrigerant in the evaporator 24 by adjusting the amount of air blown by the second blower 31.

Accordingly, the seat air conditioner 1 can appropriately adjust the heat radiation amount of the refrigerant in the condenser 22 and the heat absorption amount of the refrigerant in the evaporator 24 in the heating mode. Thus, the refrigeration cycle device 20 can be easily balanced and stably operated.

The first blower 30 in the heating mode functions as a blower for supplying conditioned air to the target space, and at the same time functions as a blower for sending the warm air WA. That is, the first blower 30 sucks air through the condenser 22 as at least one of the condenser 22 and the evaporator 24.

The second blower 31 in this case is an exhaust blower for blowing air to the outside of the target space, and at the same time, functions as a blower for blowing the cold air CA. That is, the second blower 31 sucks air through the evaporator 24 as at least the other of the condenser 22 and the evaporator 24.

Next, a specific configuration of the cabin indoor air conditioner 60 of the vehicle cabin air conditioning system AS will be described with reference to FIG. 11. As described above, the cabin indoor air conditioner 60 conditions air for the entire cabin C of the hybrid vehicle, and has the front seat air conditioning unit 61 and the rear seat air conditioning unit 72. The cabin indoor air conditioner 60 corresponds to an indoor air conditioner.

The front seat air conditioning unit 61 has a front seat casing 62 arranged inside the instrument panel on the front side of the cabin C. The front seat casing 62 forms an air passage for supplying the conditioned air A from the front side of the cabin C in the front seat air conditioning unit 61. A first interior heat exchanger 63, a front seat heater core 64, and a second interior heat exchanger 65 are housed inside the front seat casing 62.

The low-pressure refrigerant that circulates in the cabin side refrigeration cycle 82 and air to be blown into the cabin C exchange heat in the first interior heat exchanger 63. The front seat heater core 64 is a radiator for heating the air by the heat of the high-temperature heat medium. The high-pressure refrigerant circulating in the cabin side refrigeration cycle 82 and air to be blown into the cabin C exchange heat in the second interior heat exchanger 65.

As the high-temperature heat medium in the front seat heater core 64, it is possible to use cooling water that recovers heat exhausted from a component such as an engine of the hybrid vehicle, high-pressure refrigerant in the refrigeration cycle, or the like.

Figure 11:
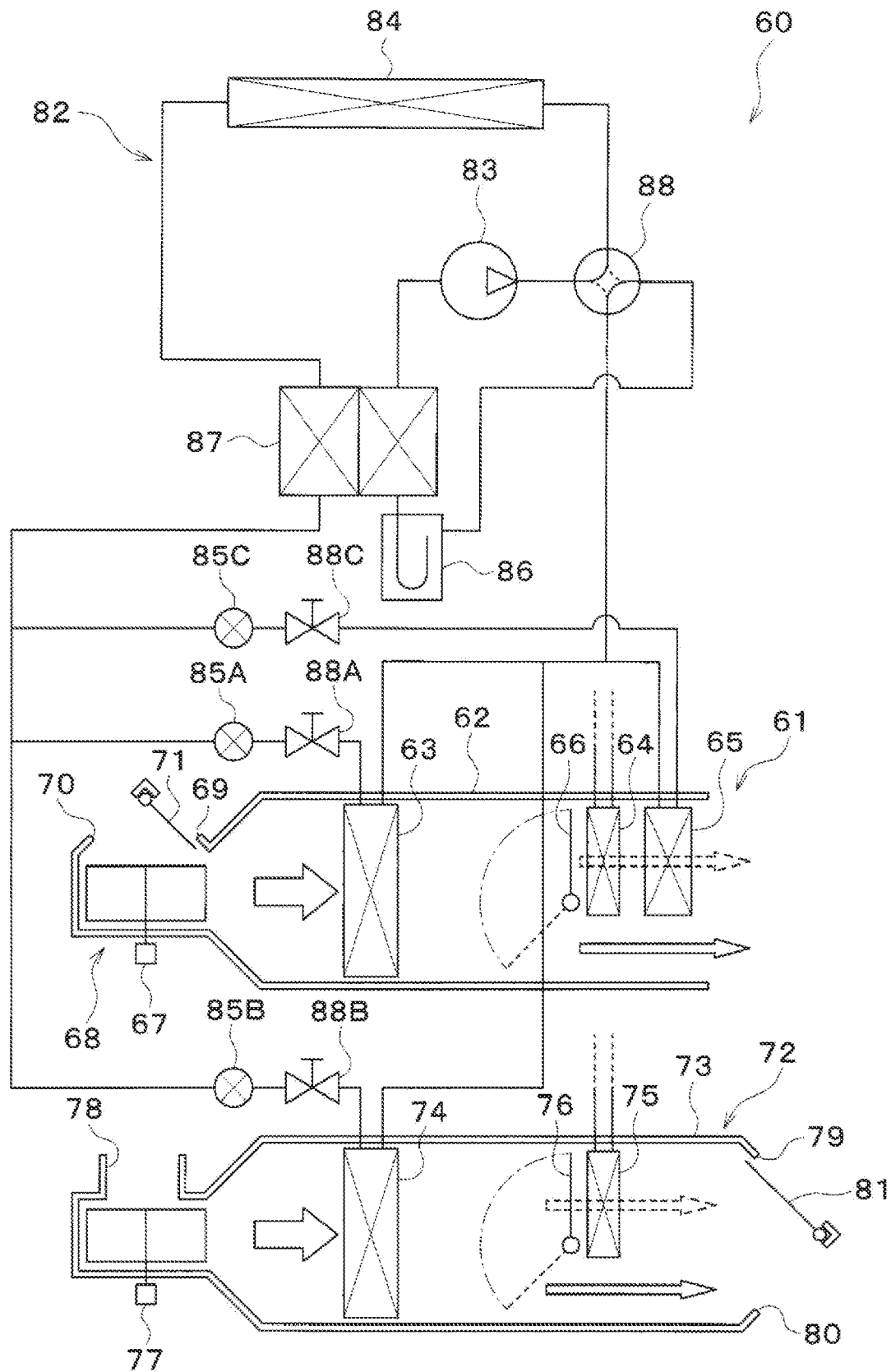
FIG. 11 is a configuration diagram of a cabin indoor air conditioner in the vehicle cabin air conditioning system.

As shown in FIG. 11, the first interior heat exchanger 63, the front seat heater core 64, and the second interior heat exchanger 65 are arranged in this order from the upstream side in the air flow inside the front seat casing 62.

A front seat air mix door 66 is rotatably arranged at the upstream side of the front seat heater core 64 in the air flow. The front seat air mix door 66 controls the amount of warm air heated by passing through the front seat heater core 64 and the second interior heat exchanger 65 to flow into the cabin C and the amount of cold air that bypasses the front seat heater core 64 and the second interior heat exchanger 65 to flow into the cabin C.

Therefore, the temperature of the conditioned air A blown from the front seat air conditioning unit 61 into the cabin C is controlled by adjusting the opening degree of the front seat air mix door 66 (that is, the air flow ratio between the warm air amount and the cold air amount).

A front seat blower 67 and an inside/outside air switching box 68 are arranged in the front seat casing 62. The inside/outside air switching box 68 switchingly introduces air (inside air) inside the cabin C and/or air (outside air) outside the cabin C into the air passage inside the front seat casing 62.

The inside/outside air switching box 68 has an inside air inlet 69 communicating with the inside of the cabin C, an outside air inlet 70 communicating with outside of the cabin C, and a switching door 71. The switching door 71 is rotatably arranged inside the inside/outside air switching box 68, and is driven by a servo motor (not shown).

The inside/outside air switching box 68 drives the switching door 71 to set an inside air mode to introduce the inside air IA (air inside the cabin) through the inside air inlet 69, and an outside air mode to introduce the outside air OA (air outside the cabin) through the outside air inlet 70. That is, the inside/outside air switching box 68 can adjust the inside air amount and the outside air amount with respect to the air supplied to the cabin C through the front seat casing 62. The inside/outside air switching box 68 corresponds to an inside/outside air control unit.

The front seat blower 67 is arranged downstream of the inside/outside air switching box 68 in the air flow. The front seat blower 67 sends air into the cabin C by driving a centrifugal multi-blade fan by an electric motor. The front seat blower 67 can adjust the amount of air blown from the front seat air conditioning unit 61 into the cabin C by performing drive control of the electric motor by the air conditioning control unit 100. Therefore, the front seat blower 67 functions as a cabin blower.

As shown in FIG. 1, the rear seat air conditioning unit 72 has a rear seat casing 73 arranged in the rearmost part of the cabin C (for example, a trunk room or a luggage space). The rear seat casing 73 forms an air passage for supplying the conditioned air A from the rear side of the cabin C in the rear seat air conditioning unit 72. A rear seat interior heat exchanger 74 and a rear seat heater core 75 and the like are housed in the rear seat casing 73.

Heat is exchanged between the refrigerant circulating in the cabin side refrigeration cycle 82 and air supplied from the rear seat air conditioning unit 72 into the cabin C in the rear seat interior heat exchanger 74. The rear seat heater core 75 is disposed on the downstream side of the rear seat casing 73 in the air flow, and is a radiator that radiates heat of the high-temperature heat medium in the cabin indoor air conditioner 60 to the air supplied from the rear seat air conditioning unit 72 into the cabin C.

The high-temperature heat medium in the rear seat heater core 75, as in the front seat heater core 64, may be cooling water that collects heat generated in a component such as an engine of a hybrid vehicle, or high-pressure refrigerant in a refrigeration cycle. The high-temperature heat medium may be the same as the high-temperature heat medium in the front seat heater core 64, or may be different from that in the front seat heater core 64.

The rear seat air mix door 76 is rotatably arranged upstream of the rear seat heater core 75 in the air flow, inside the rear seat casing 73. The rear seat air mix door 76 adjusts the amount of warm air heated while passing through the rear seat heater core 75 toward the cabin C, and the amount of cold air that bypasses the rear seat heater core 75 to flow into the cabin C.

A rear seat blower 77 and a rear seat suction port 78 are arranged in the rear seat air conditioning unit 72. The rear seat blower 77 is arranged inside the rear seat casing 73, and sends air by driving a centrifugal multi-blade fan by an electric motor. The rear seat blower 77 can adjust the amount of air blown from the rear seat air conditioning unit 72 into the cabin C by controlling the drive of the electric motor by the air conditioning control unit 100. Therefore, the rear seat blower 77 functions as a cabin blower.

The rear seat suction port 78 is arranged upstream of the rear seat blower 77 in the air flow inside the rear seat casing 73. The rear seat suction port 78 communicates the inside of the rear seat casing 73 with the inside of the cabin C.

Therefore, the rear seat air conditioning unit 72 can suck air outside the rear seat casing 73 from the rear seat suction port 78 while the rear seat blower 77 is operated. The rear seat suction port 78 in the first embodiment corresponds to a suction port.

As shown in FIG. 1, in the vehicle cabin air conditioning system AS according to the first embodiment, the end of the exhaust duct 90 is attached to the rear seat suction port 78. Therefore, the rear seat air conditioning unit 72 can suck air inside the exhaust duct 90 from the rear seat suction port 78 while the rear seat blower 77 is operated.

A first outlet 79, a second outlet 80, and a blowout mode switching door 81 are arranged at the downstream side in the air flow inside the rear seat casing 73. The first outlet 79 and the second outlet 80 communicate the inside of the rear seat casing 73 with the inside of the cabin C, and are opening through which the conditioned air A is supplied from the rear seat air conditioning unit 72 into the cabin C.

The first outlet 79 and the second outlet 80 are arranged at different positions in the rear seat casing 73. For example, the first outlet 79 is arranged on the front side of the rear seat casing 73, and the second outlet 80 is arranged on the upper surface of the rear seat casing 73.

The blowout mode switching door 81 is rotatably arranged upstream of the first outlet 79 and the second outlet 80 in the air flow, and is able to close the first outlet 79 or the second outlet 80. The blowout mode switching door 81 is driven by a servo motor (not shown) and can adjust the opening area of the first outlet 79 and the opening area of the second outlet 80.

That is, the blowout mode switching door 81 can adjust the flow rate of the conditioned air A blown out from the rear seat air conditioning unit 72 through the first outlet 79 and the flow rate of the conditioned air A blown out from the rear seat air conditioning unit 72 through the second outlet 80. Further, the blowout mode switching door 81 can be switched so as to blow out air from either the first outlet 79 or the second outlet 80.

Next, a specific configuration of the cabin side refrigeration cycle 82 will be described with reference to FIG. 11 for the cabin indoor air conditioner 60 to adjust the temperature.

The cabin side refrigeration cycle 82 is a so-called vapor compression type refrigeration cycle, and is arranged over the front seat air conditioning unit 61 and the rear seat air conditioning unit 72 that form the cabin indoor air conditioner 60. The cabin side refrigeration cycle 82 corresponds to a temperature control unit.

As shown in FIG. 11, the cabin side refrigeration cycle 82 has plural components in addition to the first interior heat exchanger 63, the second interior heat exchanger 65, and the rear seat interior heat exchanger 74. Specifically, the cabin side refrigeration cycle 82 further includes a compressor 83, an outdoor heat exchanger 84, a first to third pressure reducing portions 85A to 85C, a gas-liquid separator 86, an internal heat exchanger 87, a four-way valve 88 and a first to third solenoid valves 88A to 88C.

HFC-based refrigerant (specifically, R134a) is adopted as the refrigerant circulating in the cabin side refrigerating cycle 82, similarly to the refrigerating cycle device 20, such that vapor compression subcritical refrigeration cycle is provided in which the pressure of high-pressure side refrigerant does not exceed the critical pressure of the refrigerant. HFO refrigerant (e.g., R1234yf) or a natural refrigerant (e.g., R744) may be employed as the refrigerant. Refrigerant oil for lubricating the compressor 83 is mixed into the refrigerant and a part of the refrigerant oil circulates through the cycle together with the refrigerant.

The compressor 83 draws in, compresses, and discharges the refrigerant circulating in the cabin side refrigeration cycle 82. The refrigerant circulates in the cycle by the operation of the compressor 83 in the cabin side refrigeration cycle 82. The outdoor heat exchanger 84 exchanges heat between outdoor air and the refrigerant circulating in the cabin side refrigeration cycle 82. The outdoor heat exchanger 84 functions as a radiator or a heat absorber by switching the refrigerant circuit in the cabin side refrigeration cycle 82.

As shown in FIG. 11, the first interior heat exchanger 63, the second interior heat exchanger 65, and the rear seat interior heat exchanger 74 are connected in parallel with each other between the internal heat exchanger 87 and the four-way valve 88.

The first to third pressure reducing portions 85A to 85C depressurize and expand the high-pressure refrigerant in the cabin side refrigeration cycle 82 in an isenthalpic manner, and are configured by, for example, expansion valves. The first pressure reducing portion 85A is arranged in the refrigerant pipe connected to the first interior heat exchanger 63 to decompress the refrigerant flowing through the refrigerant pipe.

The second pressure reducing portion 85B is arranged in the refrigerant pipe connected to the rear seat interior heat exchanger 74 to decompress the refrigerant flowing through the refrigerant pipe. The third pressure reducing portion 85C is arranged in the refrigerant pipe connected to the second interior heat exchanger 65 to decompress the refrigerant flowing through the refrigerant pipe.

The gas-liquid separator 86 separates the refrigerant passing through the gas-liquid separator 86 into a gas-phase refrigerant and a liquid-phase refrigerant, and stores a surplus refrigerant in the cycle as a liquid-phase refrigerant. Since the gas-liquid separator 86 is arranged on the suction side of the compressor 83, the gas-phase refrigerant can be reliably supplied to the compressor 83.

In the internal heat exchanger 87, heat is exchanged between the low-pressure refrigerant drawn into the compressor 83 and the high-pressure refrigerant flowing through the cabin side refrigeration cycle 82. The internal heat exchanger 87 can reduce the enthalpy of the refrigerant flowing into the first pressure reducing portion 85A and the second pressure reducing portion 85B by heat exchange inside.

The four-way valve 88 constitutes a circuit switching unit for switching the refrigerant circuit in the cabin side refrigeration cycle 82. The four-way valve 88 has four refrigerant outlet/inlet ports, and the refrigerant pipe is connected to each of the ports.

Specifically, the refrigerant outlet/inlet ports of the four-way valve 88 are connected with s a discharge pipe of the compressor 83, a refrigerant pipe connected to the outdoor heat exchanger 84, a refrigerant pipe connected to the gas-liquid separator 86, and a refrigerant pipe connected in parallel with the first interior heat exchanger 63.

The four-way valve 88 can switch the refrigerant circuit of the cabin side refrigeration cycle 82 by switching the connection mode of the four refrigerant pipes, thereby switching the air conditioning modes such as cooling and heating in the cabin indoor air conditioner 60. Specifically, the four-way valve 88 changes the refrigerant discharged from the compressor 83 to flow toward the outdoor heat exchanger 84 or to flow toward the second interior heat exchanger 65 and the rear seat interior heat exchanger 74 by switching.

As shown in FIG. 11, the first solenoid valve 88A is connected to the inlet/outlet port of the first pressure reducing portion 85A. The first solenoid valve 88A is an opening/closing valve that opens/closes the refrigerant passage in which the first pressure reducing portion 85A is arranged. The second solenoid valve 88B is connected to the inlet/outlet port of the second pressure reducing portion 85B. The second solenoid valve 88B opens/closes the refrigerant passage in which the second pressure reducing portion 85B is arranged.

The third solenoid valve 88C is connected to the inlet/outlet side of the third pressure reducing portion 85C. The third solenoid valve 88C opens/closes the refrigerant passage in which the third pressure reducing portion 85C is arranged. In the cabin side refrigeration cycle 82, the refrigerant circuit can be switched by controlling the opening/closing of the first solenoid valve 88A to the third pressure reducing portion 85C. That is, the first solenoid valve 88A to the third solenoid valve 88C form a circuit switching unit similarly to the four-way valve 88.

Next, the operation of the cabin indoor air conditioner 60 in the cooling mode will be described. In this case, the air conditioning control unit 100 controls the first solenoid valve 88A and the second solenoid valve 88B to be in the open state, and controls the third solenoid valve 88C to be in the closed state. The four-way valve 88 is also controlled so that the refrigerant discharged from the compressor 83 flows into the outdoor heat exchanger 84.

As a result, when the cabin indoor air conditioner 60 is in the cooling mode, the refrigerant in the cabin side refrigeration cycle 82 flows in order of the compressor 83, the four-way valve 88, the outdoor heat exchanger 84, and the internal heat exchanger 87. The refrigerant is branched into a refrigerant passage having the first pressure reducing portion 85A and a refrigerant passage having the second pressure reducing portion 85B.

In the refrigerant passage having the first pressure reducing portion 85A, the refrigerant flows in order of the first pressure reducing portion 85A, the first solenoid valve 88A, and the first interior heat exchanger 63. In the refrigerant passage having the second pressure reducing portion 85B, the refrigerant flows in order of the second pressure reducing portion 85B, the second solenoid valve 88B, and the rear seat interior heat exchanger 74.

The refrigerant flowing out from the first interior heat exchanger 63 merges with the refrigerant flowing out from the rear seat interior heat exchanger 74. The refrigerant flows in order of the four-way valve 88, the gas-liquid separator 86, and the internal heat exchanger 87, and is sucked into the compressor 83 again.

According to the cooling mode, air flowing through the front seat casing 62 can be cooled by the cold heat of the low-pressure refrigerant decompressed by the first pressure reducing portion 85A in the cabin side refrigeration cycle 82. Therefore, the front seat air conditioning unit 61 can supply the conditioned air A cooled in the cabin side refrigeration cycle 82 into the cabin C.

In the cabin side refrigeration cycle 82, the cold heat of the low-pressure refrigerant decompressed by the second pressure reducing portion 85B can cool the air flowing through the rear seat casing 73. Therefore, the rear seat air conditioning unit 72 can supply the conditioned air A cooled in the cabin side refrigeration cycle 82 into the cabin C.

In the cabin side refrigeration cycle 82 in the cooling mode, the outdoor heat exchanger 84 functions as a radiator that radiates the warm heat of the high-pressure refrigerant of the cabin side refrigeration cycle 82 to outside air outside the cabin C.

The dehumidifying and heating mode of the front seat air conditioning unit 61 and the dehumidifying and heating mode of the rear seat air conditioning unit 72 can be realized individually by allowing the high-temperature heat medium to flow into the front seat heater core 64 and the rear seat heater core 75 in this refrigerant circuit state.

In the dehumidifying and heating mode of the front seat air conditioning unit 61, the high-temperature heat medium is supplied to the front seat heater core 64 so that the air cooled by the first interior heat exchanger 63 can be heated by the warm heat of the front seat heater core 64, to supply the dehumidified and heated conditioned air A. At this time, the temperature of the dehumidified and heated conditioned air A can be adjusted to a desired temperature by controlling the operation of the front seat air mix door 66.

In the dehumidifying and heating mode of the rear seat air conditioning unit 72, the high-temperature heat medium is supplied to the rear seat heater core 75, so that the air cooled by the rear seat interior heat exchanger 74 is heated by warm heat of the rear seat heater core 75. Thus, it is possible to supply the dehumidified and heated conditioned air A. In this case, the temperature of the dehumidified and heated conditioned air A can be adjusted to a desired temperature by controlling the operation of the rear seat air mix door 76.

Next, the operation of the cabin indoor air conditioner 60 in the heating mode will be described. In the heating mode, the air conditioning control unit 100 controls the second solenoid valve 88B and the third solenoid valve 88C to be in the open state and the first solenoid valve 88A to be in the closed state. The four-way valve 88 is controlled so that the refrigerant discharged from the compressor 83 flows into the second interior heat exchanger 65 and the rear seat interior heat exchanger 74.

As a result, when the cabin indoor air conditioner 60 is in the cooling mode, the refrigerant in the cabin side refrigeration cycle 82 flows in order of the compressor 83 and the four-way valve 88, and is branched into the refrigerant passage having the rear seat interior heat exchanger 74 and the refrigerant passage having the second interior heat exchanger 65.

In the refrigerant passage having the rear seat interior heat exchanger 74, the refrigerant flows in order of the rear seat interior heat exchanger 74, the second solenoid valve 88B, and the second pressure reducing portion 85B. In the refrigerant passage having the second interior heat exchanger 65, the refrigerant flows in order of the second interior heat exchanger 65, the third solenoid valve 88C, and the third pressure reducing portion 85C.

The refrigerant flowing out from the second pressure reducing portion 85B merges with the refrigerant flowing out from the third pressure reducing portion 85C. The refrigerant flows in order of the internal heat exchanger 87, the outdoor heat exchanger 84, the four-way valve 88, the gas-liquid separator 86, the internal heat exchanger 87, and is again sucked into the compressor 83.

According to the heating mode, in the cabin side refrigeration cycle 82, the warm heat of the high-pressure refrigerant flowing out of the compressor 83 is dissipated in the second interior heat exchanger 65, so that the air flowing through the front seat casing 62 can be heated. Therefore, the front seat air conditioning unit 61 can supply the conditioned air A heated in the cabin side refrigeration cycle 82 into the cabin C.

In the cabin side refrigeration cycle 82, the warm heat of the high-pressure refrigerant flowing out from the compressor 83 is dissipated by the rear seat interior heat exchanger 74, so that the air flowing through the rear seat casing 73 can be heated. Therefore, the rear seat air conditioning unit 72 can supply the conditioned air A heated in the cabin side refrigeration cycle 82 into the cabin C.

In the cabin side refrigeration cycle 82 in the heating mode, the outdoor heat exchanger 84 functions as a heat absorber, and absorbs the heat of the outdoor air into the low-pressure refrigerant of the cabin side refrigeration cycle 82.

Figure 12:
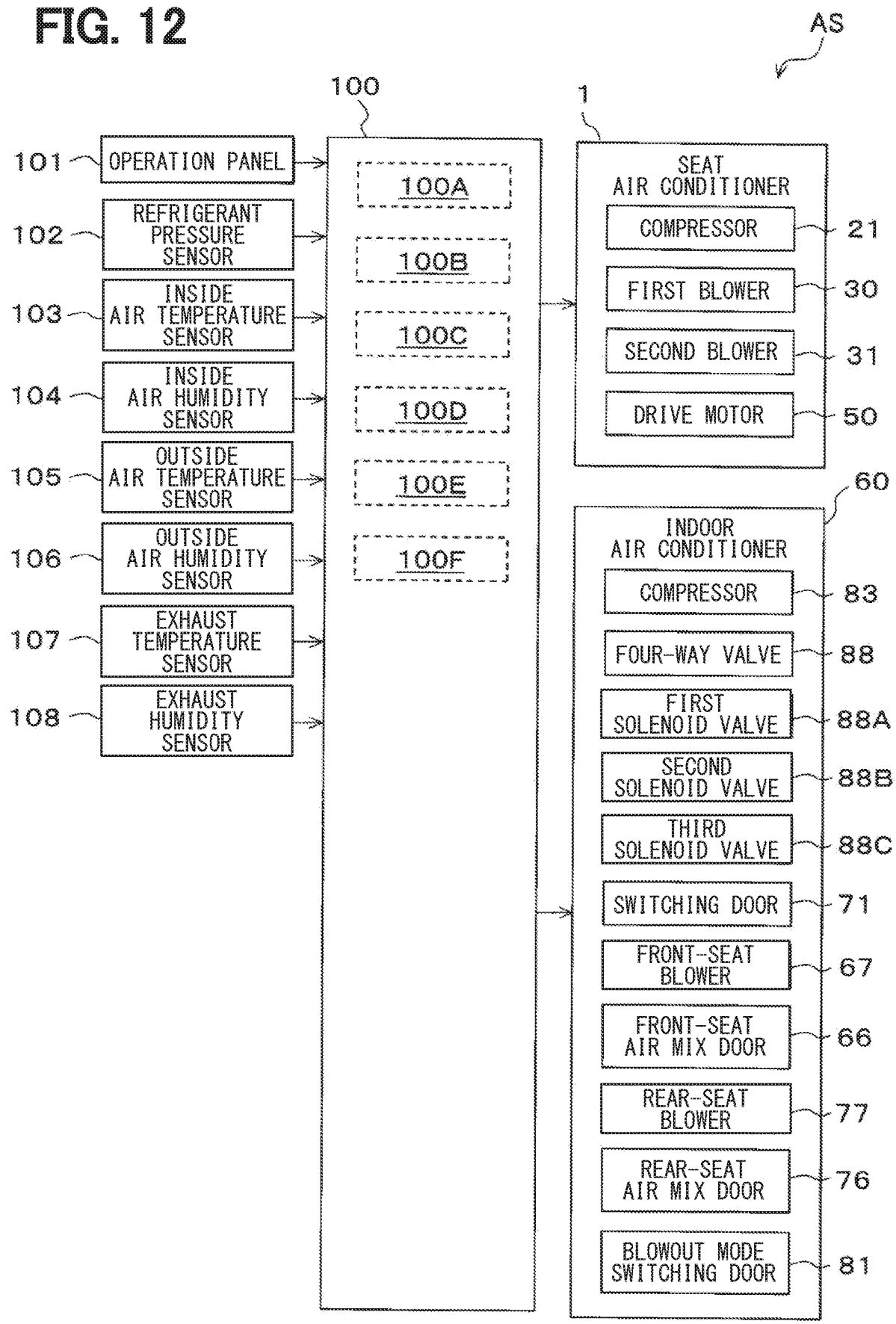
FIG. 12 is a block diagram showing a control system of the vehicle cabin air conditioning system.

Next, the control system of the vehicle cabin air conditioning system AS will be described with reference to FIG. 12. As shown in FIG. 12, the vehicle cabin air conditioning system AS includes the air conditioning control unit 100 for controlling each component of the vehicle cabin air conditioning system AS.

The air conditioning control unit 100 includes a well-known microcomputer including a CPU, a ROM, a RAM, and the like, and peripheral circuits of the microcomputer. Then, the air conditioning control unit 100 performs various arithmetic processes based on the control program stored in the ROM to control the operation of each component.

The seat air conditioner 1 and the cabin indoor air conditioner 60 are connected on the output side of the air conditioning control unit 100, as control target devices in the vehicle cabin air conditioning system AS. More specifically, the compressor 21, the first blower 30, the second blower 31, and the drive motor 50 are connected to the output side of the air conditioning control unit 100 as components of the seat air conditioner 1.

Therefore, the air conditioning control unit 100 can control the air conditioning operation of the seat air conditioner 1, such as the refrigerant discharge performance of the compressor 21 (for example, the refrigerant pressure), the blowing performance of the first blower 30 (for example, the blowing amount), or the blowing performance of the second blower 31 according to the situation.

The air conditioning control unit 100 controls the operation of the drive motor 50 in the seat air conditioner 1 to adjust the air volume balance of the cold air CA and the warm air WA in the warm air switching unit 35 and the cold air switching unit 40. That is, the air conditioning control unit 100 can change the operation mode of the seat air conditioner 1 to one of the cooling mode, the heating mode, and the air mix mode.

As shown in FIG. 12, the front seat air mix door 66, the front seat blower 67, the switching door 71, the rear seat air mix door 76, the rear seat blower 77, the blowout mode switching door 81, the compressor 83, the four-way valve 88, the first solenoid valve 88A, the second solenoid valve 88B, and the third solenoid valve 88C are connected on the output side of the air conditioning control unit 100 as components of the cabin indoor air conditioner 60.

Therefore, the air conditioning control unit 100 can control the air conditioning operation in the cabin indoor air conditioner 60. Specifically, the air conditioning control unit 100 can realize the air conditioning by the front seat air conditioning unit 61 and the air conditioning operation by the rear seat air conditioning unit 72.

The operation panel 101 and plural air conditioning sensors are connected to the input side of the air conditioning control unit 100. The operation panel 101 is used for various operations by the passenger P in order to control the operation of the vehicle cabin air conditioning system AS. For example, the operation panel 101 is used to instruct the air conditioning mode of the seat air conditioner 1, and the air conditioning mode of the front seat air conditioning unit 61 and the rear seat air conditioning unit 72.

The air conditioning sensors connected to the air conditioning control unit 100 include a refrigerant pressure sensor 102, an inside air temperature sensor 103, an inside air humidity sensor 104, an outside air temperature sensor 105, an outside air humidity sensor 106, an exhaust temperature sensor 107, and an exhaust humidity sensor 108.

The refrigerant pressure sensor 102 is a detector for detecting the pressure of the high-pressure refrigerant in the cabin side refrigeration cycle 82. The inside air temperature sensor 103 is a detector for detecting the temperature of the inside air inside the cabin C. The inside air humidity sensor 104 is a detector for detecting the humidity of the inside air of the cabin C.

The outside air temperature sensor 105 is a detector for detecting the temperature of outside air outside the cabin C. The outside air humidity sensor 106 is a detector for detecting the humidity of outside air outside the cabin C.

The exhaust temperature sensor 107 is a detector that detects the temperature of the exhaust air EA sent from the exhaust port 16 of the seat air conditioner 1. The exhaust humidity sensor 108 is a detector that detects the humidity of the exhaust air EA sent from the exhaust port 16.

The air conditioning control unit 100 integrally has a control unit that controls various control devices connected to the output side thereof. A configuration (hardware and software) that controls the operation of each control device corresponds to a control unit that controls the operation of each control device.

For example, a portion of the air conditioning control unit 100 that controls the operation of the seat air conditioner 1 constitutes a seat air conditioning control unit 100A. A portion of the air conditioning control unit 100 that controls the operation of the front seat air conditioning unit 61 of the cabin indoor air conditioner 60 constitutes a front seat air conditioning control unit 100B.

A portion of the air conditioning control unit 100 that controls the operation of the rear seat air conditioning unit 72 of the cabin indoor air conditioner 60 constitutes a rear seat air conditioning control unit 100C. A portion of the air conditioning control unit 100 that determines an outside air load using the detection results of the outside air temperature sensor 105 and the outside air humidity sensor 106 constitutes an outside air load determination unit 100D.

A portion of the air conditioning control unit 100 that determines an exhaust load using the detection results of the exhaust temperature sensor 107 and the exhaust humidity sensor 108 constitutes an exhaust load determination unit 100E. A portion of the air conditioning control unit 100 that switches the flow of the exhaust air EA sent from the exhaust port 16 with the switching mechanism 91 described later constitutes an exhaust switching control unit 100F.

With the configuration shown in FIG. 12, the vehicle cabin air conditioning system AS realizes individual air conditioning for the target space of the rear seat SB by the seat air conditioner 1, and at the same time, realizes air conditioning for the entire cabin C by the cabin indoor air conditioner 60.

In the vehicle cabin air conditioning system AS, when the cold air CA is supplied to the target space by the seat air conditioner 1, the warm air WA is sent out as the exhaust air EA from the exhaust port 16 of the seat air conditioner 1.

If the exhaust air EA of the seat air conditioner 1 is directly discharged to the cabin C while the seat air conditioner 1 and the cabin indoor air conditioner 60 are operating in the cooling mode, the high-temperature exhaust air EA affects the cooling of the cabin C and the cooling of the target space of the rear seat SB.

When the seat air conditioner 1 supplies the warm air WA to the target space, the cold air CA is sent out from the exhaust port 16 of the seat air conditioner 1 as the exhaust air EA. If the exhaust air EA of the seat air conditioner 1 is directly discharged to the cabin C while the seat air conditioner 1 and the cabin indoor air conditioner 60 are operating in the heating mode, the low-temperature exhaust air EA affects the heating of the cabin C and the heating of the target space of the rear seat SB.

According to the vehicle cabin air conditioning system AS of the first embodiment, as shown in FIG. 1, the exhaust duct 90 is provided between the seat air conditioner 1 and the rear seat air conditioning unit 72 of the cabin indoor air conditioner 60.

One end of the exhaust duct 90 in the first embodiment is connected to the exhaust port 16 of the seat air conditioner 1. Therefore, the exhaust air EA generated by the air conditioning operation of the seat air conditioner 1 flows into the exhaust duct 90 via the exhaust port 16.

The other end of the exhaust duct 90 is attached to the rear seat suction port 78 of the rear seat air conditioning unit 72. Therefore, the exhaust air EA flowing through the exhaust duct 90 is guided from the rear seat suction port 78 into the rear seat casing 73. That is, the exhaust duct 90 functions as an air flow path.

The other end of the exhaust duct 90 may be connected to the rear seat suction port 78 with other method while the exhaust air EA is made to flow into the rear seat suction port 78 of the rear seat air conditioning unit 72.

For example, the other end of the exhaust duct 90 may be directly connected and fixed to the rear seat suction port 78. Further, the other end of the exhaust duct 90 may be arranged around the rear seat suction port 78 and a space may be provided between the exhaust duct 90 and the rear seat suction port 78.

The exhaust duct 90 is configured so that its length can expand and contract, for example, a flexible duct configured in a bellows shape (so-called bellows duct). Therefore, even when the rear seat SB is slid in the front-rear direction in the cabin C, the exhaust duct 90 expands or contracts.

Therefore, it is possible to maintain the position of one end of the exhaust duct 90 with respect to the exhaust port 16 and the position of the other end of the exhaust duct 90 with respect to the rear seat suction port 78. Thus, the exhaust air EA can be stably guided from the exhaust port 16 to the rear seat suction port 78.

According to the vehicle cabin air conditioning system AS, the exhaust air EA from the exhaust port 16 of the seat air conditioner 1 is guided to the rear seat suction port 78 of the rear seat air conditioning unit 72 via the exhaust duct 90. The temperature of the conditioned air A is adjusted inside the rear seat air conditioning unit 72, and the conditioned air A can be supplied into the cabin C.

For example, when the seat air conditioner 1 and the cabin indoor air conditioner 60 are operating in the cooling mode, as shown in FIGS. 5 to 7, the exhaust air EA having the high temperature, which is derived from the warm air WA is sent from the exhaust port 16 of the seat air conditioner 1.

According to the vehicle cabin air conditioning system AS, the high-temperature exhaust air EA is guided to the rear seat suction port 78. The rear seat air conditioning unit 72 cools the high-temperature exhaust gas EA, and the low-temperature conditioned air A can be supplied to the inside of the cabin C.

As a result, according to the vehicle cabin air conditioning system AS, the passenger P can be restricted from feeling mist caused by the exhaust air EA having high temperature, such that the passenger P is comfortable by cooling the cabin C and the target space of the rear seat SB.

Figure 8:
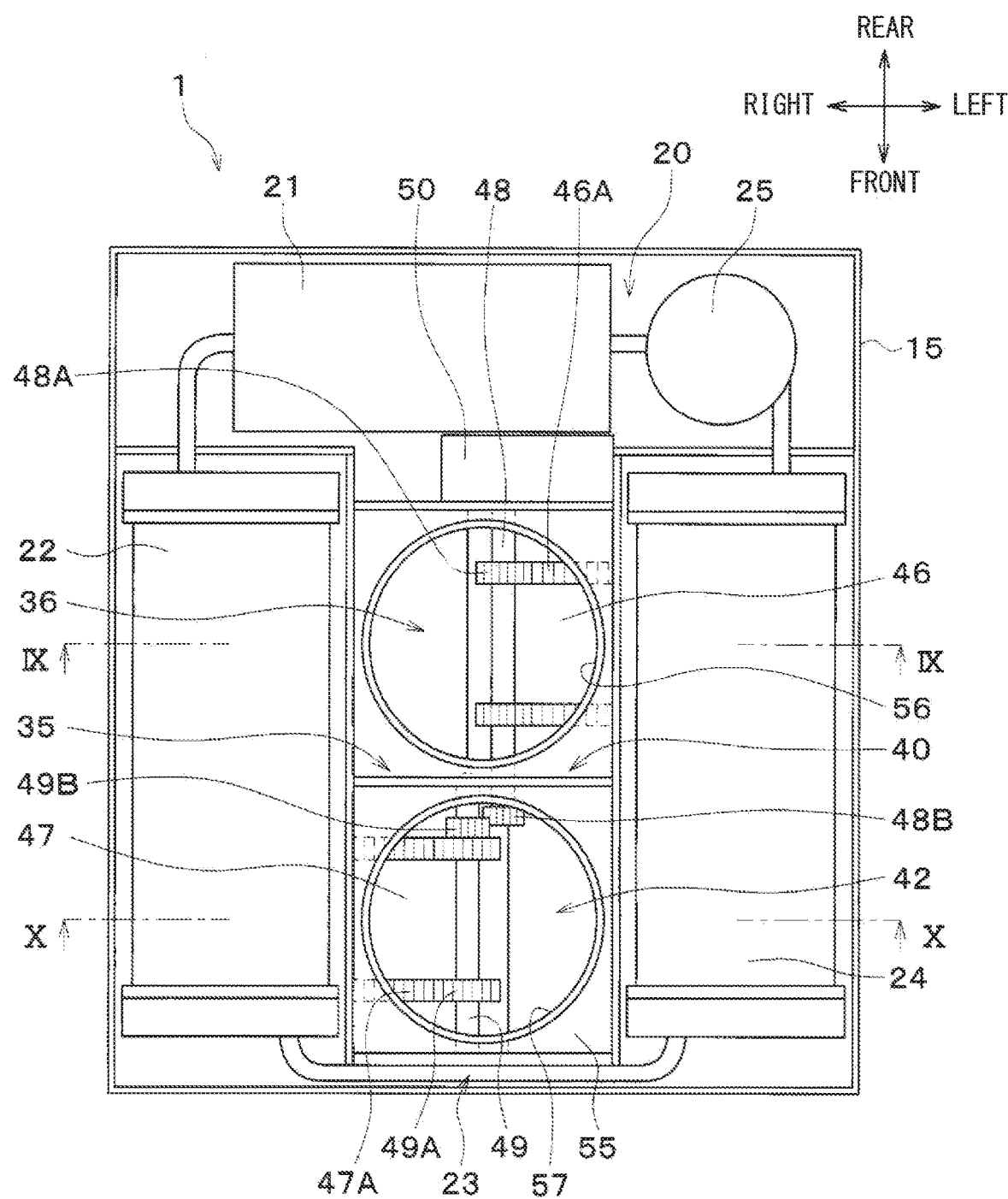
FIG. 8 is a plan view showing an internal configuration of the seat air conditioner in a heating mode.

When the seat air conditioner 1 and the cabin indoor air conditioner 60 are operating in the heating mode, the exhaust air EA having the low temperature, which is derived from the cold air CA, is sent from the exhaust port 16 of the seat air conditioner 1 as shown in FIGS. 8 to 10.

According to the vehicle cabin air conditioning system AS, the low-temperature exhaust air EA is guided to the rear seat suction port 78. The rear seat air conditioning unit 72 heats the low-temperature exhaust air EA, and the high-temperature conditioned air A can be supplied to the inside of the cabin C.

As a result, according to the vehicle cabin air conditioning system AS, the passenger P can be restricted from feeling chill caused by the exhaust air EA having the low temperature. The passenger P is comfortable by heating the cabin C and the target space of the rear seat SB.

Further, in the vehicle cabin air conditioning system AS, the exhaust air EA is directly introduced into the rear seat suction port 78 of the rear seat air conditioning unit 72 via the exhaust duct 90. Therefore, according to the vehicle cabin air conditioning system AS, the load of air suctioned in the rear seat air conditioning unit 72 becomes high, compared with a case where the inside air in the cabin C is used in the rear seat air conditioning unit 72 after the exhaust air EA is discharged into the cabin C.

Therefore, the vehicle cabin air conditioning system AS can operate the rear seat air conditioning unit 72 of the cabin indoor air conditioner 60 in a state where the COP is higher. Thus, the deterioration in power efficiency of the cabin indoor air conditioner 60 caused by the exhaust heat of the seat air conditioner 1 can be suppressed to a small level.

As a result of comparing the thermal load of the exhaust air EA of the seat air conditioner 1 with the thermal load of the outside air outside the cabin C, when the thermal load of the exhaust air EA is low, the deterioration in the air conditioning power efficiency in the vehicle cabin air conditioning system AS can be suppressed, compared with the case where the exhaust air EA is discharged outside the cabin C.

According to the vehicle cabin air conditioning system AS of the first embodiment, it is possible to realize both the overall air conditioning for the interior of the cabin C by the cabin indoor air conditioner 60 and the individual air conditioning for the target space of the rear seat SB by the seat air conditioner 1. As a result, the vehicle cabin air conditioning system AS can diversify the air conditioning mode in the cabin C and can improve the comfort of the passenger P under various situations.

According to the vehicle cabin air conditioning system AS, the exhaust air EA from the exhaust port 16 of the seat air conditioner 1 can be guided to the rear seat suction port 78 of the cabin indoor air conditioner 60 by the exhaust duct 90.

As a result, the vehicle cabin air conditioning system AS can supply the conditioned air A to the cabin C after the cabin side refrigeration cycle 82 of the cabin indoor air conditioner 60 adjusts the temperature of the exhaust air EA sucked from the rear seat suction port 78.

That is, the vehicle cabin air conditioning system AS can suppress the passenger P from feeling uncomfortable in the cabin C (for example, mist during cooling, chill during heating) compared with case where the exhaust air EA of the seat air conditioner 1 is directly discharged into the cabin C.

Further, in the vehicle cabin air conditioning system AS, the thermal load of the exhaust air EA supplied through the exhaust duct 90 is higher than the thermal load when the exhaust air EA is discharged into the cabin C and then sucked from the rear seat suction port 78. As a result, the vehicle cabin air conditioning system AS can operate the cabin indoor air conditioner 60 in a high COP state.

According to the vehicle cabin air conditioning system AS, it is possible to suppress the influence of exhaust heat due to the operation of the seat air conditioner 1 and to minimize the deterioration in power efficiency of the cabin indoor air conditioner 60 due to the exhaust heat.

According to the vehicle cabin air conditioning system AS, the seat air conditioner 1 is configured to perform an air conditioning operation for the target space defined in the rear seat SB, so that the comfort of the passenger P seated on the rear seat SB can be certainly improved.

Second Embodiment

A second embodiment different from the first embodiment will be described with reference to FIG. 13. The vehicle cabin air conditioning system AS according to the second embodiment includes the seat air conditioner 1, the cabin indoor air conditioner 60, and the air conditioning control unit 100, as in the first embodiment. The basic configuration is the same as that of the first embodiment, and thus the repetitive description will be omitted.

In the vehicle cabin air conditioning system AS according to the second embodiment, the configuration of the exhaust duct 90 through which the exhaust air EA of the seat air conditioner 1 flows is different from that of the first embodiment. Therefore, in the second embodiment, the configuration of the exhaust duct 90 will be described in detail. In the following description, the same reference numerals as those in the first embodiment indicate the same configurations, and refer to the preceding description.

Figure 13:
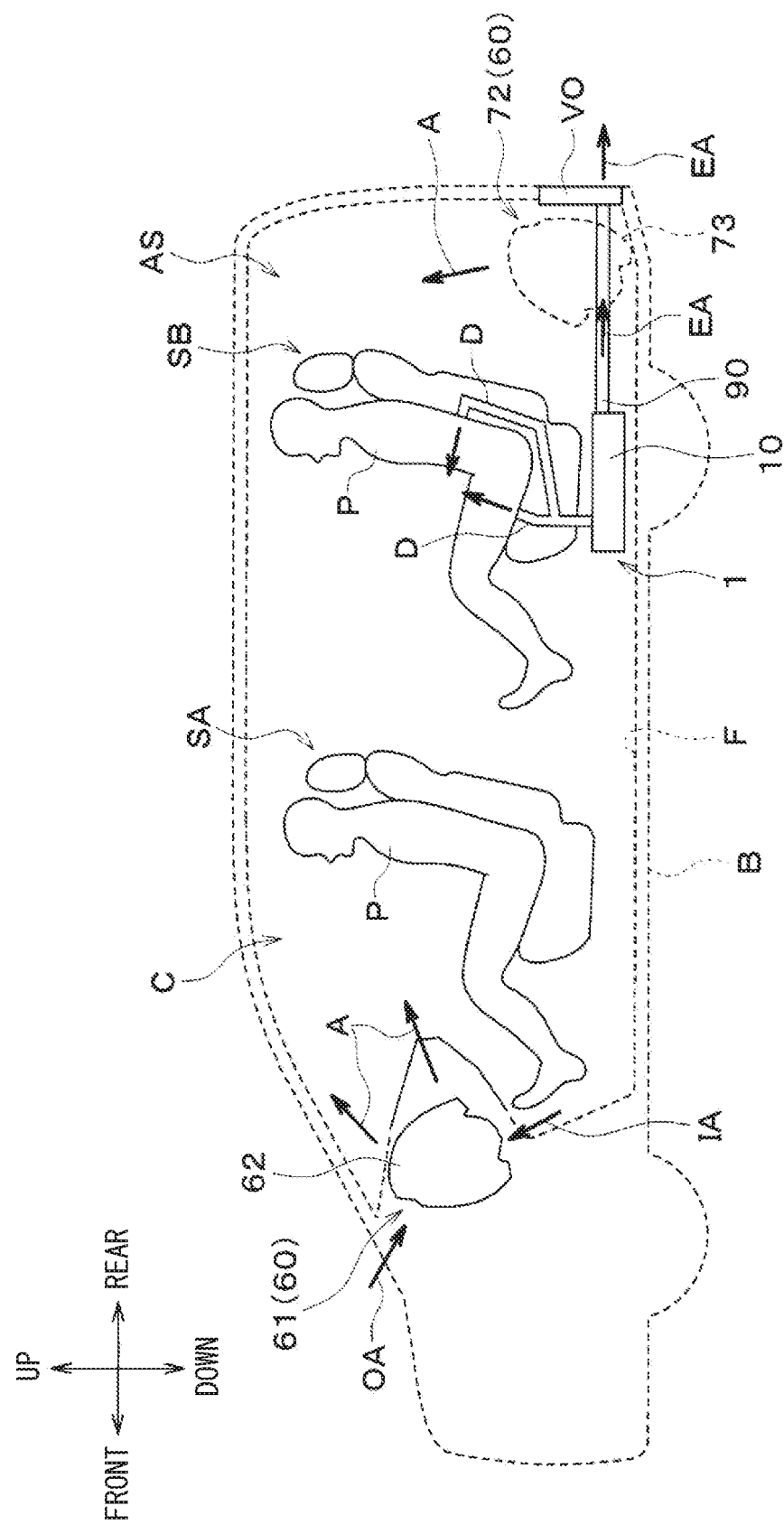
FIG. 13 is an overall configuration diagram of a vehicle cabin air conditioning system according to a second embodiment.

As shown in FIG. 13, in the vehicle cabin air conditioning system AS according to the second embodiment, the exhaust duct 90 is located between the seat air conditioner 1 in the rear seat SB and the ventilation port VO of the hybrid vehicle.

One end of the exhaust duct 90 according to the second embodiment is connected to the exhaust port 16 of the seat air conditioner 1 as in the first embodiment. Therefore, also in the second embodiment, the exhaust air EA generated by the air conditioning operation of the seat air conditioner 1 flows into the exhaust duct 90 via the exhaust port 16.

The other end of the exhaust duct 90 according to the second embodiment is attached to the ventilation port VO arranged in the rear part of the cabin C. Therefore, the exhaust air EA flowing through the exhaust duct 90 is exhausted to the outside of the cabin C from the ventilation port VO. The exhaust duct 90 according to the second embodiment functions as a ventilation flow path.

The method for attaching the other end of the exhaust duct 90 to the ventilation port VO, according to the second embodiment, can be appropriately changed while the exhaust air EA can flow into the ventilation port VO. For example, the other end of the exhaust duct 90 may be directly connected and fixed to the ventilation port VO. Alternatively, the other end of the exhaust duct 90 may be arranged around the ventilation port VO, and a space may be provided between the exhaust duct 90 and the ventilation port VO.

The exhaust duct 90 according to the second embodiment is configured such that its length is expandable/contractible like the first embodiment, for example, a flexible duct configured in a bellows shape (so-called bellows duct).

Therefore, in the second embodiment, even when the positional relationship between the exhaust port 16 of the seat air conditioner 1 and the ventilation port VO is changed due to the sliding movement of the rear seat SB, the exhaust air EA can be guided to the ventilation port VO stably.

As a result, according to the vehicle cabin air conditioning system AS of the second embodiment, the exhaust air EA generated by the air conditioning operation of the seat air conditioner 1 is discharged from the ventilation port VO to the outside of the cabin C via the exhaust duct 90. According to the vehicle cabin air conditioning system AS, the air in the cabin C is not affected by the exhaust air EA from the seat air conditioner 1.

That is, according to the vehicle cabin air conditioning system AS, the exhaust air EA of the seat air conditioner 1 is restricted from increasing the discomfort of the passenger P in the cabin C (for example, mist during cooling, chill during heating).

In the second embodiment, when the exhaust air EA generated by the air conditioning operation of the seat air conditioner 1 is discharged from the ventilation port VO to the outside of the cabin C via the exhaust duct 90, the air conditioning control unit 100 controls the operation of the cabin indoor air conditioner 60.

Specifically, the air conditioning control unit 100 controls the operation of the switching door 71 of the inside/outside air switching box 68 and the front seat blower 67 in the cabin indoor air conditioner 60, so that amount of outside air OA introduced into the cabin C via the inside/outside air switching box 68 from the outside of the cabin C is adjusted In this case, the amount of outside air OA introduced into the cabin C is determined so as to be equal to the amount of exhaust air EA discharged from the ventilation port VO to the outside of the cabin C. The air conditioning control unit 100 determines the amount of exhaust air EA discharged from the ventilation port VO by referring to the amount of air blown by the second blower 31 in the seat air conditioner 1 to determine the amount of outside air OA introduced into the cabin C.

According to the vehicle cabin air conditioning system AS, by performing such operation control, the atmospheric pressure in the cabin C is restricted from becoming a negative pressure even when the exhaust air EA is exhausted from the cabin C to the outside of the vehicle.

When the cabin C has a negative pressure, air outside the vehicle easily flows into the cabin C through a gap formed by a door of the hybrid vehicle. In this case, air outside the vehicle may have a higher air conditioning load and contain an odor causing discomfort.

In this respect, according to the vehicle cabin air conditioning system AS, it is possible to suppress an increase in draft air caused by the negative pressure by suppressing the negative pressure in the cabin C. Thus, it is possible to restrict increase in the air conditioning load and restrict odors and the like from entering the cabin C. Accordingly, it is possible to maintain a comfortable state in the cabin.

As described above, according to the vehicle cabin air conditioning system AS of the second embodiment, the same operational effects as those of the first embodiment can be obtained in the same manner as the first embodiment.

According to the vehicle cabin air conditioning system AS of the second embodiment, the exhaust air EA from the exhaust port 16 of the seat air conditioner 1 is exhausted to the outside of the cabin C from the ventilation port VO via the exhaust duct 90. As a result, the vehicle cabin air conditioning system AS can suppress the influence of the exhaust air EA of the seat air conditioner 1 on the environment inside the cabin C.

Specifically, the vehicle cabin air conditioning system AS can suppress increase in the discomfort of the passenger P in the cabin C cause by the exhaust air EA of the seat air conditioner 1 (for example, mist during cooling, chill during heating).

When the exhaust air EA is discharged to the outside of the cabin C through the exhaust duct 90, the vehicle cabin air conditioning system AS controls the operation of the inside/outside air switching box 68 in the cabin indoor air conditioner 60. The amount of outside air OA equal to the amount of exhaust air EA discharged from the vehicle to the outside of the vehicle through the ventilation port VO is introduced into the cabin C.

According to the vehicle cabin air conditioning system AS, it is possible to suppress negative pressure inside the cabin C due to exhaust of the exhaust air EA to the outside of the cabin C. As a result, the vehicle cabin air conditioning system AS can maintain a comfortable state in the cabin C by restricting an increase in the air conditioning load due to an increase in draft air and invasion of odor into the cabin C.

Third Embodiment

A third embodiment different from the above-described embodiment will be described with reference to the drawings. The vehicle cabin air conditioning system AS according to the third embodiment includes the seat air conditioner 1, the cabin indoor air conditioner 60, and the air conditioning control unit 100, as in the above embodiment. The basic configuration is the same as that of the above embodiment, thus the repeated description is omitted.

In the vehicle cabin air conditioning system AS according to the third embodiment, the configuration of the exhaust duct 90 through which the exhaust air EA of the seat air conditioner 1 flows and its surroundings are different from those of the above embodiment. In the third embodiment, differences between the exhaust duct 90 and the like will be described in detail. In the following description, the same reference numerals as those in the above-described embodiment indicate the same configurations, and refer to the preceding description.

Figure 14:
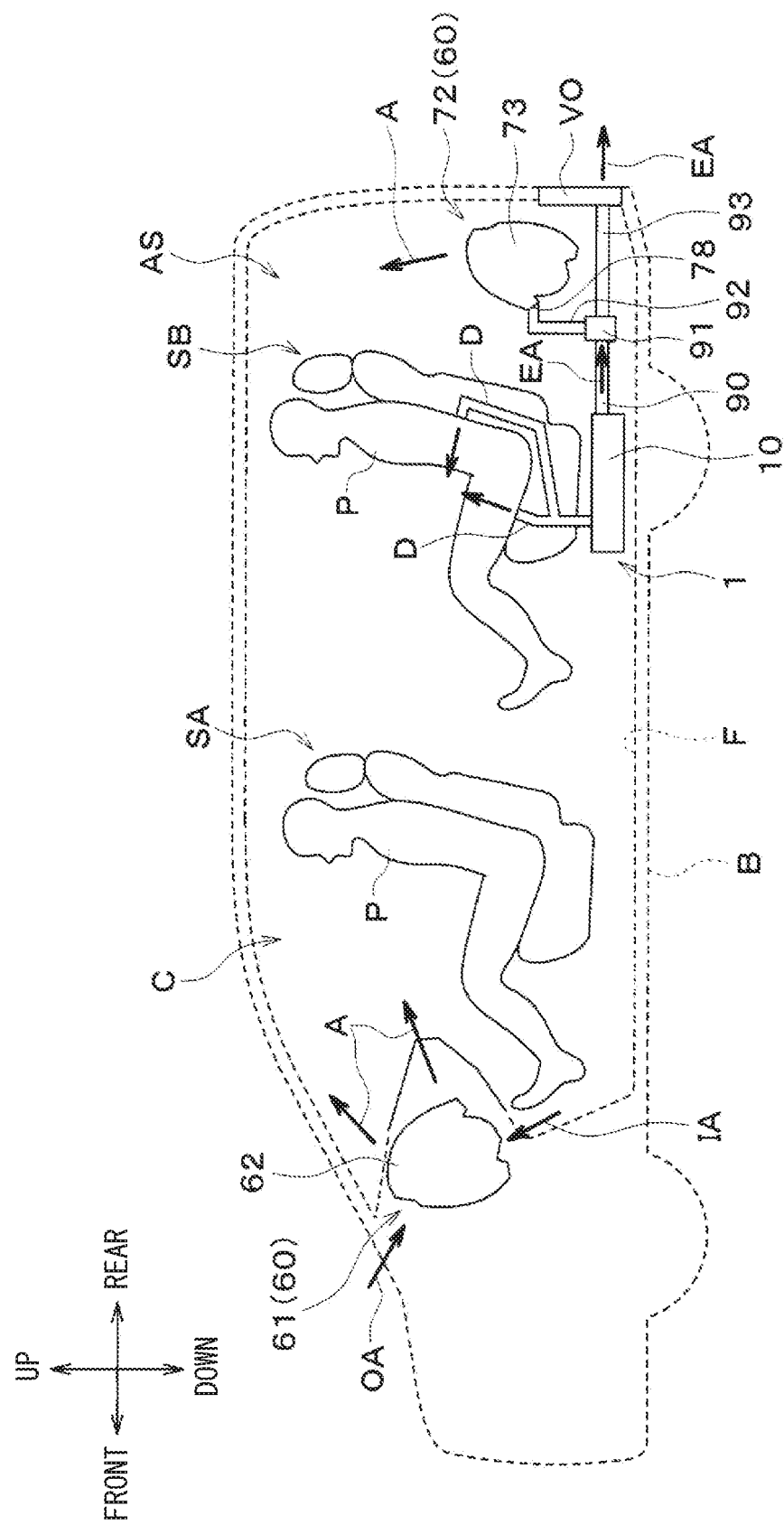
FIG. 14 is an overall configuration diagram of a vehicle cabin air conditioning system according to a third embodiment.

As shown in FIG. 14, in the vehicle cabin air conditioning system AS according to the third embodiment, a duct including the exhaust duct 90 is located between the seat air conditioner 1, and the rear seat suction port 78 of the cabin indoor air conditioner 60 and the ventilation port VO.

Similar to the above-described embodiment, one end of the exhaust duct 90 is connected to the exhaust port 16 of the seat air conditioner 1. Therefore, also in the third embodiment, the exhaust air EA generated by the air conditioning operation of the seat air conditioner 1 flows into the exhaust duct 90 via the exhaust port 16.

The other end of the exhaust duct 90 according to the third embodiment is connected to the switching mechanism 91. The switching mechanism 91 has one inflow port and two outflow ports. The other end of the exhaust duct 90 is connected to the inflow port of the switching mechanism 91. Therefore, the exhaust air EA of the seat air conditioner 1 flows into the switching mechanism 91 from the exhaust duct 90.

A rear seat supply duct 92 is connected to one of the outflow ports of the switching mechanism 91, and a ventilation duct 93 is connected to the other of the outflow ports. The rear seat supply duct 92 is connected to the rear seat suction port 78 of the rear seat air conditioning unit 72 in the cabin indoor air conditioner 60 and corresponds to an air flow path. The ventilation duct 93 connects the other outflow port of the switching mechanism 91 to the ventilation port VO. Therefore, the ventilation duct 93 corresponds to a ventilation flow path.

The switching mechanism 91 has a mechanism to switch the flow of fluid (for example, exhaust air EA) flowing in the inflow port so as to flow out from either one of the two outflow ports. A control signal from the air conditioning control unit 100 controls the operation of the switching mechanism 91.

Therefore, the vehicle cabin air conditioning system AS according to the third embodiment controls the operation of the switching mechanism 91 so that the exhaust air EA of the seat air conditioner 1 is made to flow toward the rear seat suction port 78 of the cabin indoor air conditioner 60 or to be discharged from the ventilation port VO to the outside of the vehicle.

Next, the control of the vehicle cabin air conditioning system AS according to the third embodiment will be described with reference to FIG. 15.

Figure 15:
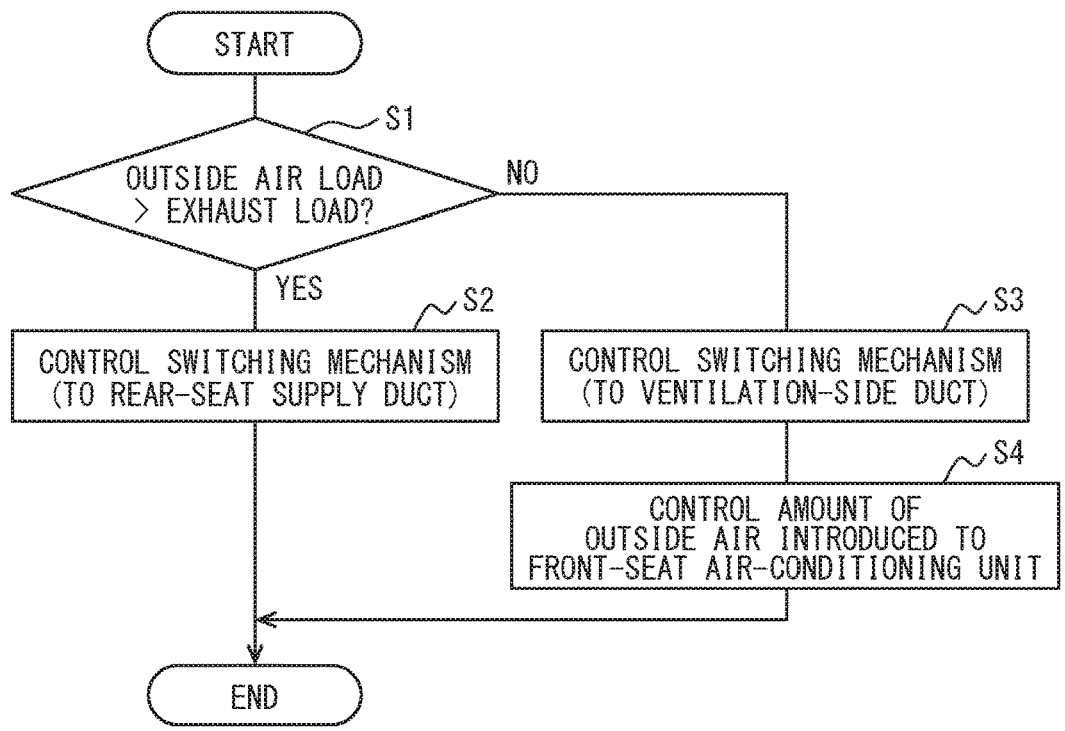
FIG. 15 is a flowchart of a control program according to the third embodiment.

The flow chart shown in FIG. 15 represents the control for appropriately processing the exhaust air EA of the seat air conditioner 1 in accordance with the environment surrounding the cabin C, and is executed by the air conditioning control unit 100 as a control program. The air conditioning control unit 100 when executing the control program functions as the exhaust switching control unit 100F and corresponds to an exhaust control unit.

The control shown in FIG. 15 is stored in the ROM of the air conditioning control unit 100 as a control program and read by the CPU. The control program is executed at least when the air conditioning operation of the seat air conditioner 1 is started. At this start point, the air conditioning operation of the cabin indoor air conditioner 60 may be performed or may be stopped.

As shown in FIG. 15, in step S1, first, it is determined whether the outside air load is larger than the exhaust load. The outside air load uses the enthalpy of air outside the cabin C as an index, and is calculated based on the detection results of the outside air temperature sensor 105 and the outside air humidity sensor 106.

The exhaust load uses the enthalpy of the air (that is, the exhaust air EA) sent from the exhaust port 16 of the seat air conditioner 1 as an index, and is calculated based on the detection results of the exhaust temperature sensor 107 and the exhaust humidity sensor 108. If the outside air load is greater than the exhaust load, the process proceeds to step S2. If the outside air load is not greater than the exhaust load, the process proceeds to step S3.

The enthalpy is used as an index of the outside air load and the exhaust load in step S1, but is not limited to this. For example, the temperature outside the cabin C and the temperature of the exhaust gas EA may be used as the index, and the index may be realized with a simple configuration.

In step S2, the operation of the switching mechanism 91 is controlled, such that the exhaust gas EA is made to flow toward the rear seat supply duct 92. After that, the control program ends. The control program is periodically executed while the air conditioning operation of the seat air conditioner 1 is being performed.

When the operation control of the switching mechanism 91 is performed in step S2, the exhaust air EA of the seat air conditioner 1 flows in order of the exhaust duct 90, the switching mechanism 91, the rear seat supply duct 92, and the rear seat suction port 78.

Therefore, in the case of step S2, the vehicle cabin air conditioning system AS can adjust the temperature of the exhaust air EA of the seat air conditioner 1 by the cabin side refrigeration cycle 82 of the cabin indoor air conditioner 60 and supply the air to the cabin C. As a result, the vehicle cabin air conditioning system AS can suppress a decrease in comfort in the cabin C due to the exhaust heat of the seat air conditioner 1.

In step S3, when the outside air load is less than or equal to the exhaust load, the switching mechanism 91 is controlled, such that exhaust air EA is made to flow toward the ventilation duct 93. After switching the switching mechanism 91 toward the ventilation duct 93, the process proceeds to step S4.

As a result, the exhaust air EA of the seat air conditioner 1 flows through the exhaust duct 90, the switching mechanism 91, the ventilation duct 93, the ventilation port VO, and is discharged to the outside of the cabin C. Therefore, since the cabin air conditioning system AS discharges the exhaust air EA of the seat air conditioner 1 to the outside of the cabin C, it is possible to suppress deterioration in the comfort in the cabin C due to the exhaust heat of the seat air conditioner 1.

In step S4, the operation of the cabin indoor air conditioner 60 is controlled to introduce the same amount of outside air OA as the exhaust air EA discharged outside the cabin C into the cabin C. In this case, the air conditioning control unit 100 specifies the amount of the exhaust gas EA discharged from the ventilation port VO from the operating state of the second blower 31 and the like of the seat air conditioner 1.

After that, the air conditioning control unit 100 controls the operation of the front seat blower 67 and the inside/outside air switching box 68 of the cabin indoor air conditioner 60 so that the outside air OA having the same amount as the specified amount of the exhaust air EA is introduced into the cabin C.

As a result, according to the cabin air conditioning system AS, it is possible to restrict the interior of the cabin C from becoming negative pressure due to the discharge of the exhaust air EA and the introduction of the outside air OA. Thus, the vehicle cabin air conditioning system AS can maintain a comfortable state in the cabin C by restricting increase in the air conditioning load due to an increase in the draft air and invasion of odors into the cabin C.

As shown in FIG. 15, according to the vehicle cabin air conditioning system AS of the third embodiment, the exhaust air EA of the seat air conditioner 1 can be appropriately handled according to the conditions of the outside air load and the exhaust load. That is, the vehicle cabin air conditioning system AS can minimize deterioration in the air conditioning power of the cabin indoor air conditioner 60 due to exhaust heat of the seat air conditioner 1.

According to the vehicle cabin air conditioning system AS of the third embodiment, it is possible to obtain the same operational effects as the configurations and operations common to those of the above-described embodiment, as in the above-described embodiment.

According to the vehicle cabin air conditioning system AS of the third embodiment, when the outside air load related to the outside air OA outside the cabin C is larger than the exhaust load related to the exhaust air EA of the seat air conditioner 1, the switching mechanism 91 is controlled to introduce the exhaust air EA into the rear seat suction port 78 of the cabin indoor air conditioner 60.

In this case, since the outside air load is larger than the exhaust load, if the exhaust air EA is discharged to the outside of the cabin C, the air conditioning power of the cabin indoor air conditioner 60 may deteriorate. That is, the vehicle cabin air conditioning system AS can suppress deterioration of the air conditioning power of the cabin indoor air conditioner 60 by appropriately processing the exhaust air EA of the seat air conditioner 1 in response to the situation that the outside air load is larger than the exhaust load.

According to the vehicle cabin air conditioning system AS, when the outside air load is equal to or less than the exhaust load, the exhaust heat EA is discharged from the exhaust ventilation port VO to the outside of the cabin C. Thus, the influence exerted on the cabin C by the exhaust heat of the seat air conditioner 1 can be suppressed.

The vehicle cabin air conditioning system AS controls the inside/outside air switching box 68 and the like to introduce the same amount of outside air OA as the discharged exhaust air EA into the cabin C, so that the inside of the cabin C can be restricted from becoming a negative pressure. As a result, it is possible to suppress a reduction in comfort caused by the entry of air into the cabin C from the gap.

In this case, since the outside air load is equal to or less than the exhaust load, if the exhaust air EA flows out into the cabin C, the air conditioning power of the cabin indoor air conditioner 60 may deteriorate. That is, the vehicle cabin air conditioning system AS can suppress deterioration of the air conditioning power of the cabin indoor air conditioner 60 by appropriately processing the exhaust air EA of the seat air conditioner 1 in response to the situation that the outside air load is equal to or less than the exhaust load.

Fourth Embodiment

Next, a fourth embodiment different from the above embodiment will be described with reference to the drawings. The vehicle cabin air conditioning system AS according to the fourth embodiment includes the seat air conditioner 1, the cabin indoor air conditioner 60, and the air conditioning control unit 100, as in the above embodiment. The basic configuration is the same as that of the above embodiment, thus the repeated description is omitted.

In the vehicle cabin air conditioning system AS according to the fourth embodiment, the arrangement of the exhaust duct 90 is different from that of the above embodiment. The differences in the exhaust duct 90 will be described in detail in the fourth embodiment. In the following description, the same reference numerals as those in the above-described embodiment indicate the same configurations, and refer to the preceding description.

In the vehicle cabin air conditioning system AS according to the fourth embodiment, the exhaust duct 90 is arranged between the seat air conditioner 1 and the rear seat air conditioning unit 72 of the cabin indoor air conditioner 60.

One end of the exhaust duct 90 is connected to the exhaust port 16 of the seat air conditioner 1. The other end of the exhaust duct 90 is attached to the rear seat suction port 78 of the rear seat air conditioning unit 72.

Figure 16:
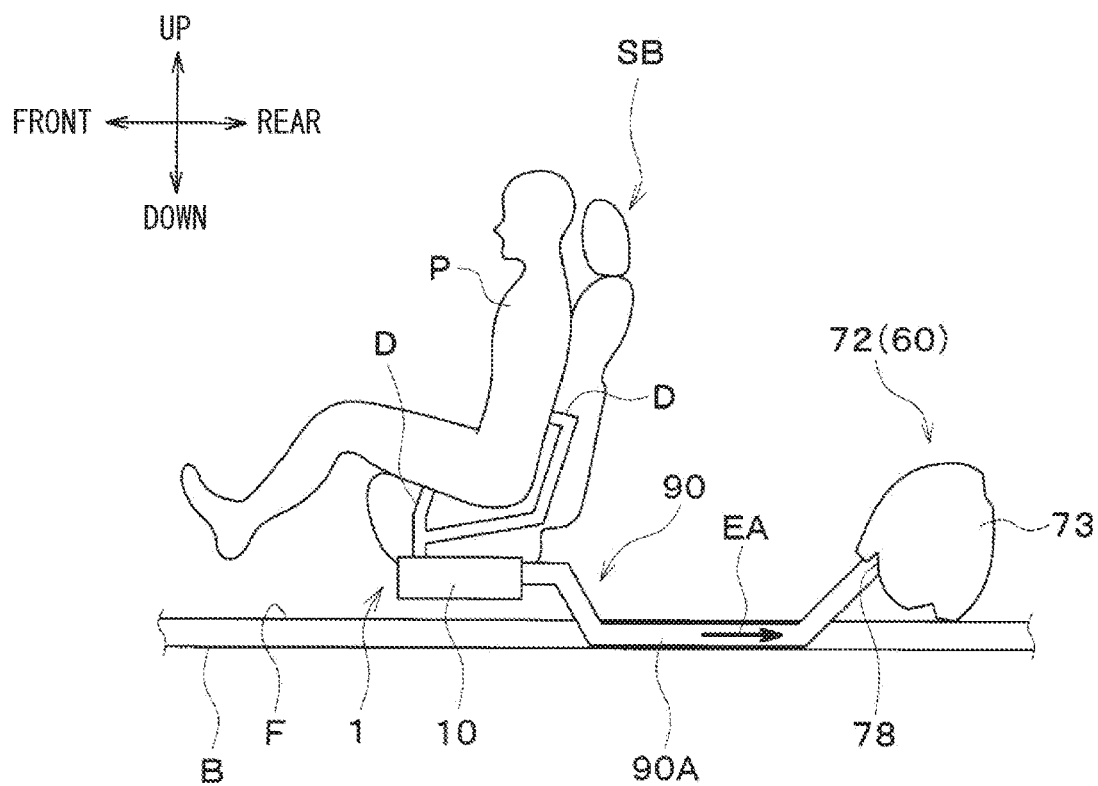
FIG. 16 is an explanatory diagram showing a connection mode of an exhaust duct in a vehicle cabin air conditioning system according to a fourth embodiment.

As shown in FIG. 16, the exhaust duct 90 according to the fourth embodiment has an underfloor passage 90A. The underfloor passage 90A is arranged and positioned between the vehicle body B which comprises the exterior of hybrid vehicle, and the cabin floor surface F which is one of the interiors of the cabin C.

The cabin floor surface F constitutes an inner surface of the cabin C and therefore corresponds to an inner member. Since the vehicle body B is arranged outside the cabin C, the vehicle body B corresponds to an outer member. The underfloor passage 90A corresponds to an outdoor flow passage.

Therefore, the exhaust duct 90 extends rearward from the seat air conditioner 1 between the cabin floor F and the vehicle body B, and extends upward from the cabin floor surface F around the rear seat suction port 78.

As a result, according to the vehicle cabin air conditioning system AS, the underfloor passage 90A is disposed in a part of the exhaust duct 90. Thus, it is possible to suppress the deterioration of the environment inside the cabin C due to the exhaust air EA, and the space occupied by the exhaust duct 90 can be reduced. That is, a space for the passenger P in the cabin C can be secured by using the underfloor passage 90A.

Further, it is possible to partially utilize the vehicle body B or the cabin floor surface F as the underfloor passage 90A. Thus, the environment inside the cabin C is restricted from deteriorated by the exhaust air EA while suppressing increase in the number of components.

As described above, according to the vehicle cabin air conditioning system AS of the fourth embodiment, it is possible to obtain the same operational effects as those of the above-described embodiment, which are achieved by the same configuration and operation as those of the above-described embodiment.

In the vehicle cabin air conditioning system AS according to the fourth embodiment, the exhaust duct 90 is provided to introduce the exhaust air EA of the seat air conditioner 1 toward the rear seat suction port 78 of the cabin indoor air conditioner 60 through the underfloor passage 90A located between the vehicle body B and the cabin floor surface F.

Therefore, according to the vehicle cabin air conditioning system AS, it is possible to suppress deterioration of the air conditioning power of the cabin indoor air conditioner 60 due to the exhaust air EA of the seat air conditioner 1 and at the same time secure a space for the passenger P in the cabin C.

Further, since the vehicle body B and the cabin floor surface F can be used as a part of the underfloor passage 90A, it is possible to suppress an increase in the number of components of the vehicle cabin air conditioning system AS including the exhaust duct 90.

(Modification of Fourth Embodiment)

In the fourth embodiment shown in FIG. 16, the exhaust duct 90 connects the exhaust port 16 of the seat air conditioner 1 to the rear seat suction port 78 of the cabin indoor air conditioner 60, but is not limited to this.

Figure 17:
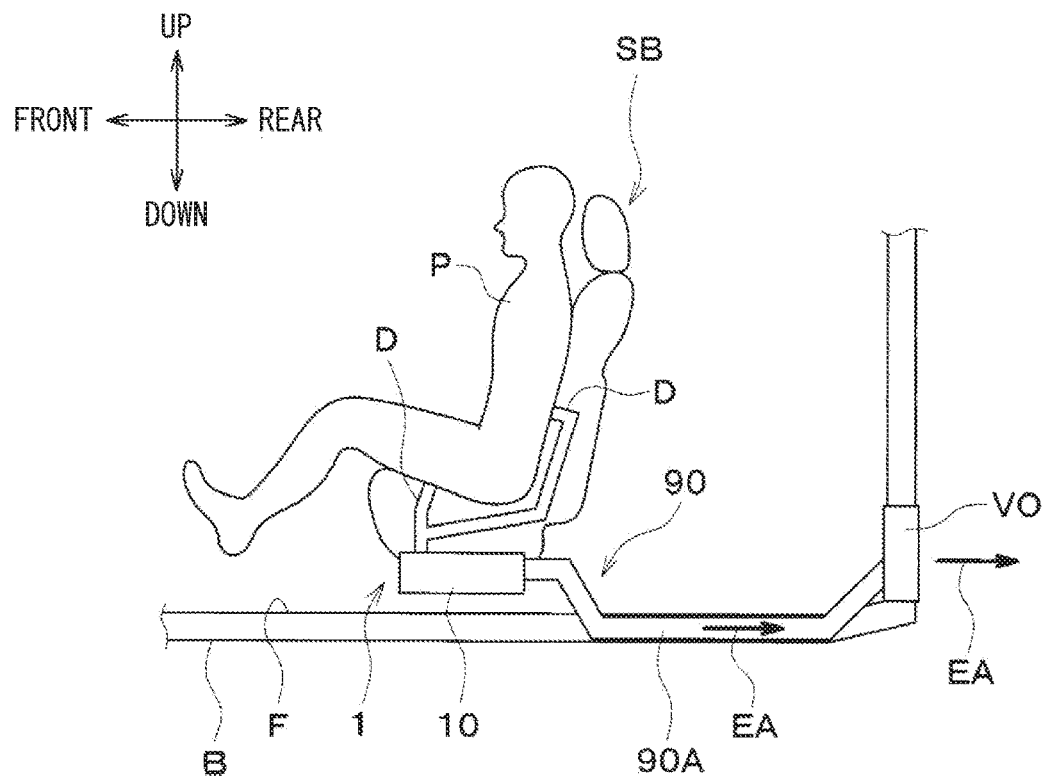
FIG. 17 is an explanatory diagram illustrating a modification of the fourth embodiment.

A shown in FIG. 17, the underfloor passage 90A can be provided in a part of the exhaust duct 90 to connect the exhaust port 16 of the seat air conditioner 1 to the ventilation port VO. The underfloor passage 90A in this case is arranged between the vehicle body B and the cabin floor surface F, as in the fourth embodiment.

Therefore, according to the modification of the vehicle cabin air conditioning system AS shown in FIG. 17, even when the exhaust air EA of the seat air conditioner 1 is discharged to the outside of the cabin C, the air conditioning power of the cabin indoor air conditioner 60 is restricted from deteriorating due to the exhaust air EA. At the same time, the space for the passenger P can be secured in the cabin C.

Further, since the vehicle body B and the cabin floor surface F can be used as a part of the underfloor passage 90A, it is possible to suppress an increase in the number of components of the vehicle cabin air conditioning system AS including the exhaust duct 90.

Fifth Embodiment

Next, a fifth embodiment different from the above-described embodiment will be described with reference to the drawings. The vehicle cabin air conditioning system AS according to the fifth embodiment includes the seat air conditioner 1, the cabin indoor air conditioner 60, and the air conditioning control unit 100, as in the above-described embodiments. The basic configuration is the same as that of the above-described embodiment, and thus the repeated description is omitted.

In the vehicle cabin air conditioning system AS according to the fifth embodiment, the configurations of the exhaust duct 90 through which the exhaust air EA of the seat air conditioner 1 flows and its surroundings are different from those of the above-described embodiment. Therefore, in the fifth embodiment, differences in the exhaust duct 90 and the like will be described in detail. In the following description, the same reference numerals as those in the above-described embodiment indicate the same configurations, and refer to the preceding description.

Figure 18:
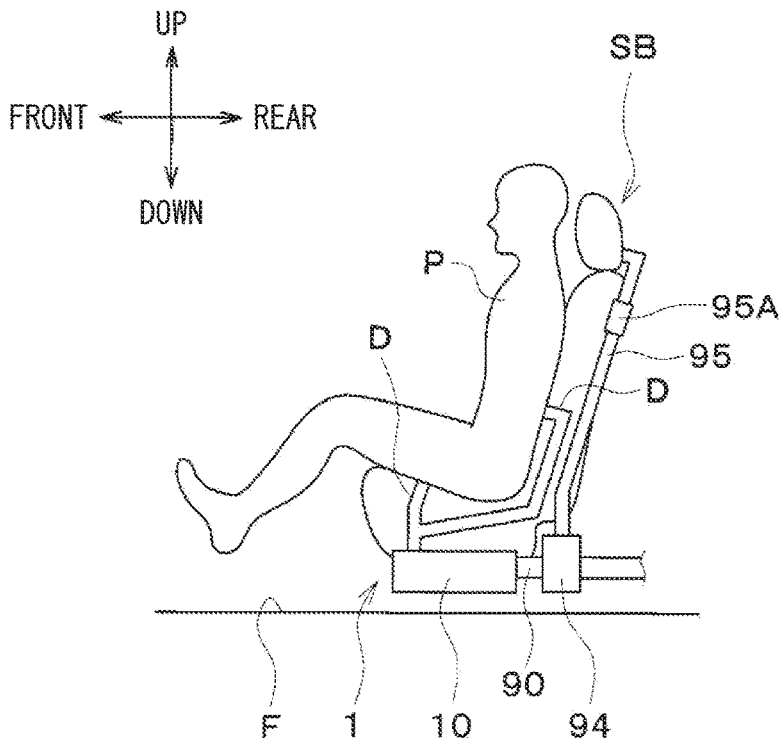
FIG. 18 is an explanatory diagram showing a modification of a seat air conditioner in a vehicle cabin air conditioning system according to a fifth embodiment.

As shown in FIG. 18, in the vehicle cabin air conditioning system AS according to the fifth embodiment, one end of the exhaust duct 90 is connected to the exhaust port 16 of the seat air conditioner 1. The other end of the exhaust duct 90 in the fifth embodiment may be connected to the rear seat suction port 78 or may be connected to the ventilation port VO.

The exhaust duct 90 according to the fifth embodiment is provided with the switching unit 94. An upper supply duct 95 is connected to the switching unit 94 and is arranged along the backrest of the rear seat SB. The switching unit 94 is controlled by the air conditioning control unit 100 to switch a part of the exhaust air EA from the seat air conditioner 1 to be branched toward the upper supply duct 95.

The upper supply duct 95 is arranged on both sides of the backrest of the rear seat SB and is extended to the upper portion of the backrest (for example, the position of the headrest). The upper end portion of the upper supply duct 95 is bent frontward, to supply the air passing through the upper supply duct 95 to the upper part of the target space of the rear seat SB. The upper supply duct 95 corresponds to an upper flow path.

An upper supply fan 95A is arranged in the flow path of the upper supply duct 95. The upper supply fan 95A is a small blower for blowing the air in the upper supply duct 95 and supplying the air to the upper part of the target space in the rear seat SB.

Next, the operation control of the switching unit 94 in the fifth embodiment will be described. As described above, the operation of the switching unit 94 is controlled by the air conditioning control unit 100. Therefore, the air conditioning control unit 100 functions as a control unit.

More specifically, the air conditioning control unit 100 causes the exhaust air EA from the seat air conditioner 1 to flow into the upper supply duct 95 when the seat air conditioner 1 and the cabin indoor air conditioner 60 are operating in the heating mode.

When the seat air conditioner 1 is operating in the heating mode, as described above, the warm air WA whose temperature is adjusted by the refrigeration cycle device 20 is supplied to the target space of the rear seat SB through the supply port 14 and the supply duct D. Therefore, the warm air WA from the seat air conditioner 1 is supplied to the trunk of the passenger P on the rear seat SB.

As described with reference to FIGS. 8 to 10, when the seat air conditioner 1 is in the heating mode, the cold air CA whose temperature is adjusted by the refrigeration cycle device 20 is blown from the exhaust port 16. That is, in the heating mode, the exhaust air EA of the seat air conditioner 1 flows into the exhaust duct 90 in a low temperature state. The exhaust air EA having the low temperature flows into the upper supply duct 95 from the switching unit 94 of the exhaust duct 90 and is blown out to the upper part of the target space in the rear seat SB.

As a result, according to the vehicle cabin air conditioning system AS in the fifth embodiment, warm air is supplied to the target space of the rear seat SB, and at the same time, the low-temperature exhaust air EA is supplied to the upper part of the target space. That is, the vehicle cabin air conditioning system AS can effectively utilize the exhaust air EA of the seat air conditioner 1 to improve the comfort of the passenger P seated on the rear seat SB such that the passenger can be cooled around the head and can be warmed around the foot.

As described above, according to the seat air conditioner 1 of the fifth embodiment, it is possible to obtain the same operational effects as the configurations and operations common to those of the above-described embodiment, as in the above-described embodiment.

According to the seat air conditioner 1 of the fifth embodiment, when the seat air conditioner 1 is operating in the heating mode, a part of the exhaust air EA in the low temperature state is supplied to the upper part of the target space of the rear seat SB through the upper supply duct 95.

Thus, while heating the target space of the rear seat SB, the upper part of the target space can be cooled to realize a so-called head-cooled and foot-heated state. Thus, the comfort of the passenger P located in the target space is improved.

Since the upper part of the target space is cooled by the exhaust air EA in the low temperature state generated by the heating operation of the seat air conditioner 1, the vehicle cabin air conditioning system AS effectively uses the exhaust air EA to improve the comfort of the passenger P.

The present disclosure is not limited to the embodiments described above, and various modifications can be made as follows within a scope not departing from the spirit of the present disclosure.

In the above-described embodiment, the seat air conditioner to condition air for the seat is described as an example of the individual air conditioner, but is not limited to this. The present disclosure can be applied to a device that intensively conditions air for a space, which is a part of the cabin C.

In the above-described embodiment, the exhaust duct 90 is used to guide the exhaust air EA of the seat air conditioner 1 to the rear seat suction port 78 and the ventilation port VO, but is not limited to this.

Figure 19:
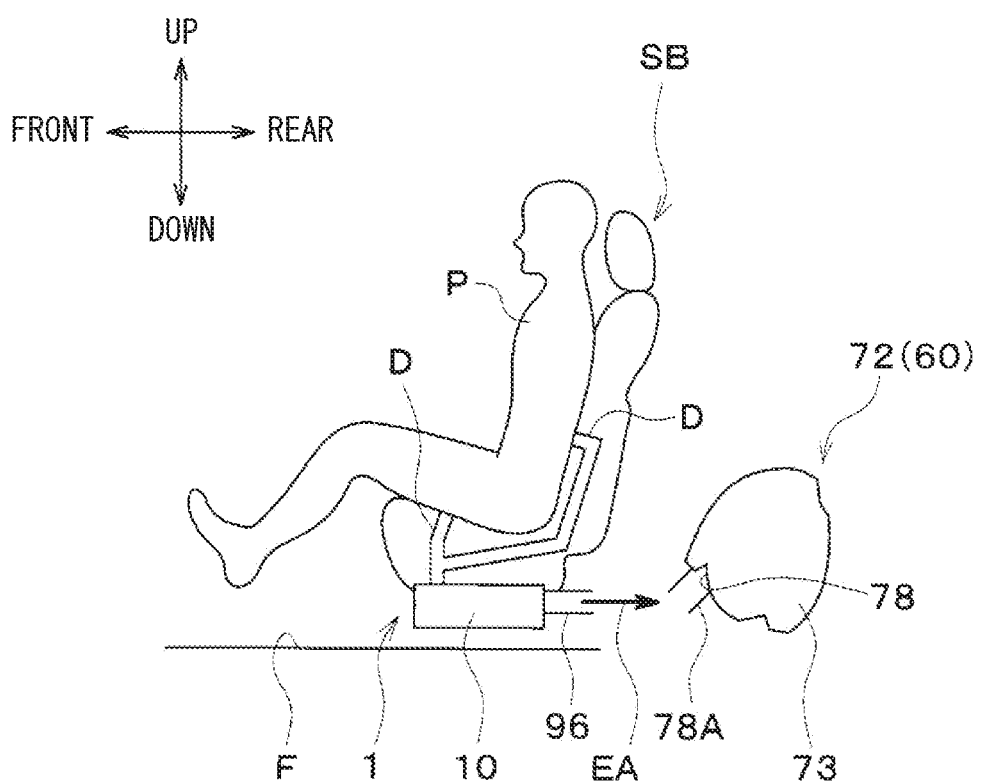
FIG. 19 is a configuration diagram showing a modification of the vehicle cabin air conditioning system.

For example, as shown in FIG. 19, instead of the exhaust duct 90, an exhaust guide member 96 and a suction assisting portion 78A may be provided. In this case, the exhaust guide member 96 is formed in a tubular shape surrounding the exhaust port 16 of the seat air conditioner 1, and is preferably configured to extend toward the rear seat suction port 78.

The suction assisting portion 78A is formed in a tubular shape surrounding the rear seat suction port 78 of the rear seat air conditioning unit 72, and is preferably configured to extend toward the exhaust port 16. Even with the configuration shown in FIG. 19, the same effect as that of the first embodiment can be expected.

In the above-described embodiment, in order to shorten the path of the exhaust duct 90, the seat air conditioner 1 is attached to the rear seat SB to supply the exhaust air EA to the rear seat suction port 78 of the rear seat air conditioning unit 72, but is not limited to this.

Figure 20:
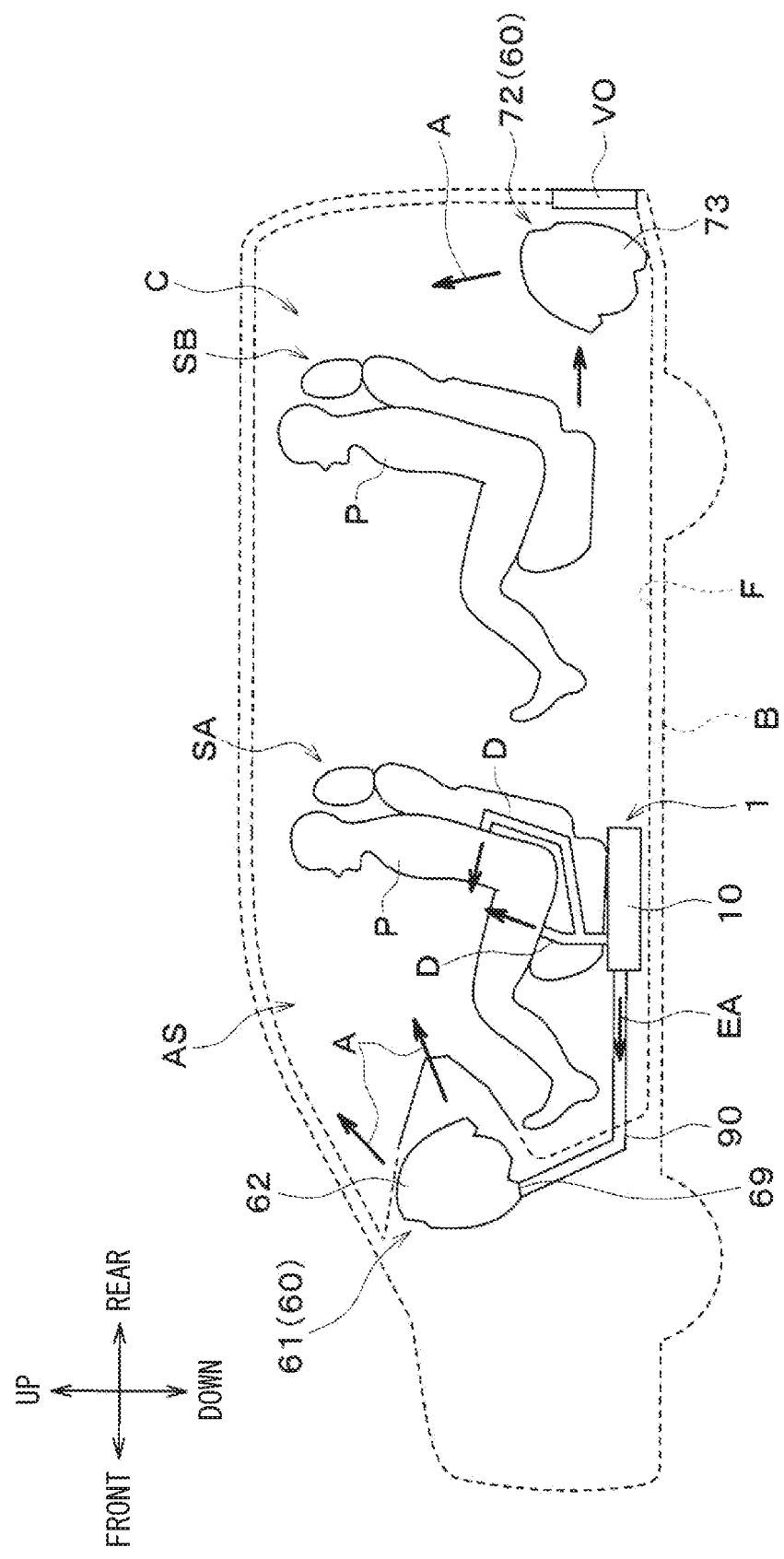
FIG. 20 is a configuration diagram of a vehicle cabin air conditioning system arranged at a front side of the cabin.

That is, as shown in FIG. 20, the vehicle cabin air conditioning system AS may include the seat air conditioner 1 attached to the front seat SA and the front seat air conditioning unit 61 of the cabin indoor air conditioner 60.

In this case, one end of the exhaust duct 90 is connected to the exhaust port 16 of the seat air conditioner 1, and the other end is attached to the inside air inlet 69 of the front seat air conditioning unit 61. With this configuration, it is possible to adjust the temperature of the exhaust air EA of the seat air conditioner 1 and supply the exhaust air EA from the front seat air conditioning unit 61 into the cabin C while shortening the path of the exhaust duct 90.

Further, the seat air conditioner 1 relating to the rear seat SB and the front seat air conditioning unit 61 may be connected by the exhaust duct 90, or the seat air conditioner 1 for the front seat SA and the rear seat air conditioning unit 72 may be connected by the exhaust duct 90. In this case, if the underfloor passage 90A is provided in a part of the exhaust duct 90, a space in the cabin C can be secured even if the path of the exhaust duct 90 is long.

In the above-described embodiment, the inside/outside air switching box 68 is arranged in the front seat air conditioning unit 61, but is not limited to this. The configuration of the cabin indoor air conditioner 60 may be appropriately changed while the inside air IA and the outside air OA can be used when generating the conditioned air A for the cabin C.

For example, the front seat casing 62 of the front seat air conditioning unit 61 may be a two-layer inside/outside air casing. Inside the casing, an air passage for introducing and flowing outside air from the outside of the cabin C and an air passage for introducing and flowing inside air of the cabin C are provided side by side. Even when a two-layer inside/outside air casing is used, the same effect as that of the above-described embodiment can be exhibited.

In the above-described embodiment, the housing 10 of the seat air conditioner 1 is attached to the bottom surface of the seat (for example, the rear seat SB), and is movable inside the cabin C back and forth as the seat slides, but is not limited to this.

For example, the housing 10 of the seat air conditioner 1 may be fixed to the cabin floor surface F. In this case, it is desirable that the supply duct D arranged between the supply port 14 of the housing 10 and the seat has a certain degree of flexibility and stretchability. For example, a flexible duct is used as the supply duct D.

In the above-described embodiment, the refrigeration cycle device 20 is used to generate cold heat and warm heat in parallel in the seat air conditioner 1, but is not limited to this. For example, instead of the refrigeration cycle device 20, it is possible to employ a Peltier element to generate cold heat and warm heat in parallel.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A vehicle cabin air conditioning system comprising:
a cabin indoor air conditioner configured to condition air in a cabin; and
an individual air conditioner configured to condition air in a target space predetermined inside the cabin, wherein
the individual air conditioner includes
a blower disposed inside a housing,
a heat generator arranged in the housing to simultaneously generate cold heat cooling air blown by the blower and warm heat heating the air,
a supply port configured to supply at least one of a cold air cooled with the cold heat generated by the heat generator and a warm air heated with the warm heat generated by the heat generator to the target space, and
an exhaust port configured to exhaust at least the other of the cold air and the warm air to outside of the target space,
the cabin indoor air conditioner includes
a cabin blower configured to blow conditioned air into the cabin,
a temperature control unit configured to adjust a temperature of air blown by the cabin blower to provide the conditioned air, and
a suction port through which air is sucked for the temperature control unit to adjust the temperature, wherein
the vehicle cabin air conditioning system further comprising: an air flow path that guides air from the exhaust port of the individual air conditioner to the suction port of the cabin indoor air conditioner.

2. The vehicle cabin air conditioning system according to claim 1, further comprising: a cabin outside passage disposed in a part of a flow path through which the air exhausted from the exhaust port flows, wherein the cabin outside passage is located between an inner member forming an inner surface of the cabin and an outer member arranged outside the cabin.

3. The vehicle cabin air conditioning system according to claim 1, wherein the individual air conditioner is a seat air conditioner that conditions air in the target space defined in a seat arranged in the cabin.

4. The vehicle cabin air conditioning system according to claim 3, further comprising
an upper flow path that guides the air exhausted from the exhaust port of the individual air conditioner to an upper part of the target space defined for the seat;

a switching unit that switches at least a part of the air exhausted from the exhaust port of the individual air conditioner to be guided to the upper flow path or not; and
a control unit that controls operation of the switching unit, wherein
when the warm air is supplied from the supply port of the individual air conditioner, the control unit controls operation of the switching unit to guide at least a part of the cold air exhausted from the exhaust port to the upper flow path.

5. A vehicle cabin air conditioning system comprising:
a cabin indoor air conditioner configured to condition air in a cabin; and
an individual air conditioner configured to condition air in a target space predetermined inside the cabin, wherein
the individual air conditioner includes
a blower disposed inside a housing,
a heat generator arranged in the housing to simultaneously generate cold heat cooling air blown by the blower and warm heat heating the air,
a supply port configured to supply at least one of a cold air cooled with the cold heat generated by the heat generator and a warm air heated with the warm heat generated by the heat generator to the target space,
an exhaust port configured to exhaust at least the other of the cold air and the warm air to outside of the target space, and
a ventilation flow path to guide the air passing through the exhaust port to outside of the cabin,
the cabin indoor air conditioner includes
a cabin blower configured to blow conditioned air into the cabin, and
an inside/outside air control unit that adjusts the amount of inside air inside the cabin and the amount of outside air outside the cabin in air sucked by the cabin blower, wherein
the inside/outside air control unit adjusts the amount of the outside air in the air sucked by the cabin blower to correspond to the amount of air flowing to the outside of the cabin through the ventilation flow path.

6. A vehicle cabin air conditioning system comprising:
a cabin indoor air conditioner configured to condition air in a cabin; and
an individual air conditioner configured to condition air in a target space predetermined inside the cabin, wherein
the individual air conditioner includes
a blower disposed inside a housing,
a heat generator arranged in the housing to simultaneously generate cold heat cooling air blown by the blower and warm heat heating the air,
a supply port configured to supply at least one of a cold air cooled with the cold heat generated by the heat generator and a warm air heated with the warm heat generated by the heat generator to the target space, and
an exhaust port configured to exhaust at least the other of the cold air and the warm air to outside of the target space,
the cabin indoor air conditioner includes
a cabin blower configured to blow conditioned air into the cabin,
an inside/outside air control unit that adjusts the amount of inside air inside the cabin and the amount of outside air outside the cabin in air sucked by the cabin blower, and
a temperature control unit configured to adjust a temperature of air sucked through the inside/outside air control unit to provide the conditioned air,
the vehicle cabin air conditioning system comprising:
a switching mechanism configured to switch the air exhausted from the exhaust port of the individual air conditioner to flow into an air flow path that guides the air to the temperature control unit of the cabin indoor air conditioner, or a ventilation flow path that guides the air to outside of the cabin; and
an exhaust control unit that controls operation of the switching mechanism based on an exhaust load related to the air exhausted from the exhaust port and an outside air load related to the outside air, wherein
when the outside air load is larger than the exhaust load, the exhaust control unit controls the operation of the switching mechanism such that the air exhausted from the exhaust port flows into the air flow path.

7. The vehicle cabin air conditioning system according to claim 6, wherein
when the outside air load is equal to or less than the exhaust load, the exhaust control unit controls the operation of the switching mechanism such that the air exhausted from the exhaust port flows into the ventilation flow path, and
the exhaust control unit controls the operation of the inside/outside air control unit so that the amount of the outside air in the air sucked by the cabin blower corresponds to the amount of the air flowing into the outside of the cabin through the ventilation flow path.

* * * * *